United States Patent [19]

Kawamoto

[11] Patent Number: 5,368,997
[45] Date of Patent: Nov. 29, 1994

[54] SILVER HALIDE PHOTOGRAPHIC MATERIAL WITH POLYESTER SUPPORT

[75] Inventor: Fumio Kawamoto, Kanagawa, Japan

[73] Assignee: Fuji Photo Film Co., Ltd., Kanagawa, Japan

[21] Appl. No.: 209,053

[22] Filed: Mar. 11, 1994

[30] Foreign Application Priority Data

Mar. 11, 1993 [JP] Japan .................................. 5-076480
Mar. 23, 1993 [JP] Japan .................................. 5-063879

[51] Int. Cl.⁵ .............................................. G03C 1/76
[52] U.S. Cl. .................................... 430/533; 430/523; 430/534; 430/535; 428/46
[58] Field of Search ............... 430/523, 533, 534, 535; 428/46

[56] References Cited

U.S. PATENT DOCUMENTS 4,900,654  2/1990  Pollock et al. ................... 430/533

*Primary Examiner*—Jack P. Brammer
*Attorney, Agent, or Firm*—Sughrue, Mion, Zinn, Macpeak & Seas

[57] ABSTRACT

A silver halide photographic material comprises a support and at least one silver halide emulsion layer provided thereon. The support is essentially composed of poly(ethylene-2,6-naphthalate) and has Young's modulus of 550 to 650 kg/mm² in both lengthwise direction and widthwise direction and breaking elongation of not less than 70%.

13 Claims, No Drawings

SILVER HALIDE PHOTOGRAPHIC MATERIAL WITH POLYESTER SUPPORT

FIELD OF THE INVENTION

The present invention relates to a silver halide photographic material which is particularly improved in a core-set curling tendency and strength.

BACKGROUND OF THE INVENTION

A photographic material is generally produced by coating one or more photographic layer (light-sensitive layer) on a plastic film support. As the plastic film support, celluloses such as triacetyl cellulose (hereinafter referred to as "TAC") or polyesters such as polyethylene terephthalate (hereinafter referred to as "PET") generally are employed.

A photographic material is generally classified into two groups: a film in the form of a sheet such as an X-ray film, a film for photomechanical process or a cut film; and a film in the form of a roll such as a color or black-and-white film having a width of 35 mm or less which is incorporated into a cylindrical cartridge (patrone). The latter film is usually employed by charging in a camera for shooting.

As material of a support for a roll film, TAC is mainly employed. The TAC has the features of a high transparency and no optical anisotropy, and further has a property of easily smoothing the curl of the film caused after development (easily curl-smoothing property).

In contrast, when a photographic material having a support which has not such an easily curl-smoothing property (that the TAC has) is used in the form of roll, scratching and out-of-focusing occur during the printing step of forming an image on a photographic printing paper, or jamming occurs during feeding of the film in the printing step.

The photographic materials has been developed to a variety of uses in these days. For instance, increase of a feeding speed of a photographic film in a camera per each shooting, increase of the image magnification and reduction of the size of the camera have been desired. The desired characteristics can be obtained by use of a support having a high bending strength, a good dimensional stability and a reduced thickness.

Particularly, the reduction of the size of the camera or the patrone is desired. To satisfy the desire, a diameter of a spool around a film is wound up is required to be reduced.

There are two problems to be solved in order to attain the size-reduction of the patrone:

One of the problems resides in the reduction of the modulus of elasticity in bending (concerned with brittleness) with reducing the thickness of the film.

The second problem resides in a strong curl tendency developed with elapse of time due to the reduction of the size of the spool (of the cartridge).

However, the TAC film has a stiff molecular structure and therefore the obtained film is too brittleness to reduce the thickness.

U.S. Pat. No. 4,141,735 discloses a process for reducing core-set curling tendency and core-set curl of polymeric film elements (polyester such as PET) which comprises heating a sheet or roll of self-supporting, core-set-prone thermoplastic polymeric film, at a temperature in the temperature range of from about 30° C. up to about The glass transition temperature (Tg) of said polymer for 0.1 to 1500 hours. The PET film is extruded at 200° C. or higher to be subjected to a heat treatment. In such heat treatment, the heated film usually is first stretched lengthwise 2 to 3 times its original length, and then similarly stretched widthwise. The finished film is further subjected to the above-described heat treatment to reduce core-set curling tendency.

However, the silver halide photographic film using the film subjected to the heat treatment in the patent is not sufficiently improved in the curling tendency and reduction of strength.

As examples of a film for the silver halide photographic film, biaxially stretched films of poly(ethylene-2,6-naphthalate), which has a high strength, have been proposed (Japanese Patent Publication No. 48(1973)-40414; and Japanese Patent Provisional Publications No. 50(1975)-81325 and No. 50(1795)-109715). Japanese Patent Provisional Publications No. 50(1795)-109715 describes a film of poly(ethylene-2,6-naphthalate) for a photographic material having a high Young's modulus (not less than 500,000 kg/cm$^2$) and a reduced difference between saturated shrinkage factors in lengthwise and widthwise directions which is prepared by stretching lengthwise 3.0 to 3.5 times and widthwise 3.3 to 3.8 times, and then similarly stretched widthwise and then subjecting to heat setting.

However, although such film of poly(ethylene-2,6-naphthalate) shows an enhanced dimensional stability, the film is satisfactorily improved in the curling tendency and reduction of strength. Further, in the case that the photographic Layer is formed on the film (support), the layer is not satisfactorily bonded to the surface of the film.

SUMMARY OF THE INVENTION

It is an object of the present invention to provide a silver halide photographic material which exhibits a reduced curling tendency and a enhanced strength.

It is another object of the present invention to provide a silver halide photographic material which exhibits a reduced curling tendency, a enhanced strength and a high bonding strength between the support and the photographic layer.

It is a further object of the present invention to provide a silver halide photographic material which is capable of inserting into the cartridge of a reduced size.

There is provided by the present invention a silver halide photographic material in continuous form which comprises a support and at least one silver halide emulsion layer provided thereon, wherein the support comprises poly(ethylene-2,6-naphthalate) and has Young's modulus of 550 to 650 kg/mm$^2$ in both lengthwise direction and widthwise direction and breaking elongation of 70 to 200% in both lengthwise direction and widthwise direction.

There is also provided by the present invention a continuous support for a silver halide photographic material comprising poly(ethylene-2,6-naphthalate) and having Young's modulus of 550 to 650 kg/mm$^2$ in both lengthwise direction and widthwise direction and breaking elongation of 70 to 200% in both the directions.

Preferred embodiments of the silver halide photographic material of the invention as follows:

1) The silver halide photographic material wherein the breaking elongation is in the range of 80 to 200% (preferably 90 to 200%).

2) The silver halide photographic material wherein the support has surface roughness of 0.0015 to 0.050 μm (preferably 0.002 to 0.050 μm).
3) The silver halide photographic material wherein the support further contains a fine particle having a particle size of 0.03 to 2.5 μm in the amount of 0.001 to 0.8 weight %.
4) The silver halide photographic material as above 3) wherein the fine particle is a spherical particle of silica, silicone or crosslinked polystyrene.
5) The silver halide photographic material wherein at least one surface of the support is subjected to a corona discharge treatment, a glow discharge treatment or a UV treatment (preferably a glow discharge treatment).
6) The silver halide photographic material which is wound around the spool having the diameter of 3 to 12 mm.
7) The silver halide photographic material wherein the support has a thickness of 50 to 100 μm.
8) The silver halide photographic material wherein the support has been biaxially stretched in the condition of the stretching magnification of 2.8 to 3.8 in both lengthwise direction and widthwise direction.
9) The silver halide photographic material as above 8), wherein the support has been subjected to heat setting at 190° to 260° C. for 1 to 60 second after the biaxial stretching.
10) The silver halide photographic material as above 8), wherein the support subjected to the biaxial stretching has been further subjected to heat treatment at a temperature of 50° C. to the glass transition temperature for 0.1 to 1,500 hours before forming the silver halide emulsion layer on the support.
11) The silver halide photographic material wherein the support has haze of not more than 3%.
12) The silver halide photographic material wherein the support has friction coefficient between two supports of not less than 0.6.
13) The silver halide photographic material wherein the support has thermal shrinkage factor of not more than 0.3% after allowing it to stand at 110° C. for 30 minutes.
14) The silver halide photographic material as above 3) wherein the support further contains a deposited particle produced during preparation of polyester.
15) The silver halide photographic material wherein the support has intrinsic viscosity of not lower than 0.45 based on a viscosity measured in orthocresol at 35° C.
16) The silver halide photographic material which is a film in the form of a roll.

The silver halide photographic material of the invention has a high strength and elongation (e.g., bending strength and flexibility) so that curl formed by set-core (by keeping bending state) and breaking by bending are scarcely produced. Further, such photographic film is capable of rendered thin and of winding around a spool of a small diameter. Hence, by using such film, the size of the cartridge can be reduced. Further, the size of a photographic film-incorporated camera using the film can be also reduced. Even if the silver halide photographic material of the invention has the same size as a conventional one, the material gives frames more than the conventional one.

Further, the photographic film scarcely generates dust or scarcely damages an edge during cutting or perforation procedure due to the high breaking elongation. Therefore, the photographic film has a high productivity.

Particularly, the photographic film having the specific lower surface roughness scarcely damages in the preperation of the support or the photographic material due to a satisfactory lubricant property, and further the photographic film which has the support subjected to the specific surface treatment has a high bonding strength between the support and the subbing layer or the photographic layer.

DETAILED DESCRIPTION OF THE INVENTION

In the invention, the support for the photographic material (film) is essentially made of poly(ethylene-2,6-naphthalate) and has Young's modulus (modulus of elasticity) of 550 to 650 kg/mm² in both lengthwise direction and widthwise direction and breaking elongation of 70 to 200%. The polyester material employed in the invention preferably is one poly(ethylene-2,6-naphthalate) derived mainly from 2,6-naphthalene dicarboxylic acid and ethylene glycol. The poly(ethylene-2,6-naphthalate) may contain other ingradients other than 2,6-naphthalene dicarboxylic acid and ethylene glycol, as a copolymer ingradient or a polymer for blend. The content of the ingradient or polymer preferably is not more than 10 molar %, and more preferably not more than 5 molar %, in terms of a ingradient.

The poly(ethylene-2,6-naphthalate) can be synthesized by a conventional method. For example, the synthesis is conducted by direct esterification of dibasic acid and glycol, by ester interchange of dialkylester of dibasic acid and glycol and remove of excess glycol under heating and reduced pressure, or by reaction of basic halide (instead of dibasic acid) with glycol. In the synthesis, further ester interchange may be carried out, or a catalyst, an initiator and a thermal stabilizer may be added.

The poly(ethylene-2,6-naphthalate) may be a copolymer or blend polymer containing at least one ingradient other than 2,6-naphthalene dicarboxylic acid and ethylene glycol, for example, by adding it before completion of polyester reaction of polyethylene-2,6-naphthalate.

Preferred other ingredients include dibasic acid such as terephthalic acid, isophthalic acid, phthalic acid, phthalic anhydride, succinic acid, adipic acid, oxalic acid or lower alkyl ester thereof; oxycarboxylic acid such as p-oxybenzoic acid, p-oxyethoxybenzoic acid or lower alkyl ester thereof; or glycol such as propylene glycol or trimethylene glycol. The hydroxyl or carboxy group at the end portion of the poly(ethylene-2,6-naphthalate) may terminated with a mono-functional compound such as benzoic acid, benzoylbenzoic acid, benzyloxybenzoic acid or methoxypolyalkylene glycol. Otherwise, the polyethylene-2,6-naphthalate may be denatured with a slight amount of 3- or 4- functional compound such as grycerol or pentaerythritol.

In the support of poly(ethylene-2,6-naphthalate) of the invention, the Young's modulus in lengthwise direction (EM) is in the range of 550 to 650 kg/mm², preferably 550 to 620 kg/mm² and more preferably 550 to 600 kg/mm². The Young's modulus in widthwise direction (ET) in the range of 550 to 650 kg/mm², preferably 550 to 620 kg/mm² and more preferably 550 to 600 kg/mm². When the difference between the Young's modulus in lengthwise direction (EM) and the Young's modulus in widthwise direction (ET> is increased, tear propagation strength in either direction of the film is lowered. Therefore, the difference is generally not more than 80 kg/mm², preferably not more than 50 kg/mm², and more preferably not more than 30 kg/mm².

The breaking elongation of the support is in the range of 70 to 200% in both lengthwise direction and widthwise direction, generally 80 to 200%, preferably 90 to 200% and more preferably 90 to 180%.

The support of poly(ethylene-2,6-naphthalate) of the invention, which has the above specific Young's modulus and the above specific breaking elongation, exhibits a high bending strength and flexibility, so that curl formed by set-core (by keeping bending state) and breaking by bending are scarcely produced. Further, when such photographic film is charged into a camera before is used, there is no occurrence of tear propagation around perforation in the case of wind-up or feeding of the film.

The support generally has thermal shrinkage factor of not more than 0.3% (0 to 0.3%) after allowing it to stand at 110° C. for 30 minutes, preferably 0 to 0.2%, and more preferably 0 to 0.15%.

In the support, the difference between the saturated shrinkage factors in lengthwise and widthwise directions generally is not more than 0.4% at temperature of not higher than 200° C., and preferably not more than 0.3%. The support having the above thermal shrinkage factor and/or the above difference between the saturated shrinkage factors exhibits an improved dimensional stability and a reduced curling tendency.

The polyester of poly(ethylene-2,6-naphthalate) has intrinsic viscosity of not lower than 0.45 based on a viscosity (e.g., a number of second) measured in orthocresol at 35° C. The intrinsic viscosity generally is in the range of 0.45 to 1.2, preferably in the range of 0.50 to 1.2 and more preferably in the range of 0.55 to 1.2. In the case of less than 0.45, the strength of the resultant polymer is reduced and therefore such polymer is not suitable for the support of the silver halide photographic material.

The support of poly(ethylene-2,6-naphthalate) having the above specific Young's modulus and the above specific breaking elongation is, for example, prepared by conducting the biaxial stretching (biaxial orientation), heat-setting and heat-relaxation through controlling their various operation conditions.

First, a polyester material is first fused. The fused polyester material is fused by heating at temperature of its melting point (Tm.) to (Tm+70° C.). The melted (fused) polyesters is extruded to obtain the polyester in the form of sheet. Thereafter the film is subjected to biaxial stretching simultaneously or successively in a lengthwise direction and in a widthwise direction. Each of the stretchings in the both directions is generally carried out in the range of 2.5 to 5.0 times (preferably 2.8 to 3.8), at temperature in the range of the glass transition point (Tg) to (Tg+70° C.). The biaxial stretching is preferably performed so as to have area stretching magnification of 9 to 22, and more preferably 12 to 22. The stretching in a lengthwise direction or widthwise direction may be conducted in two or more times.

In the support of the invention, the above biaxial stretching process is performed in the specific conditions in order to improve the curling tendency. The stretching process is usually carried out by regulating stretching speed in addition to a stretching temperature and stretching magnification. The stretching speed is preferably regulated at 30%/second to 200%/second in the both lengthwise and widthwise directions, more preferably 30 %/second to 130%/second, most preferably 30%/second to 100%/second.

The support of poly(ethylene-2,6-naphthalate) having the above specific Young's modulus and the above specific breaking elongation is advantageously obtained by generally stretching at relatively high temperature and at a relatively slow speed.

When the stretching magnification is less than 2.5, the resultant polyester film does not show satisfactory flexibility. When the stretching magnification is more than 5.0, the resultant polyester film does not show satisfactory bending strength, i.e., show increased brittleness. Thus, the polyester stretched in the range of the above stretching magnification is enhanced in flexibility without reduction of bending strength.

The stretched polyester is preferably subjected to heat setting treatment (heat-set). The heat setting treatment is generally conducted at (Tg+70° C.) to Tm, preferably at the temperature of 190° to 260° C. and more preferably at the temperature of 220° to 260° C. The time period for the heat setting treatment preferably is 1 to 60 seconds.

The polyester support may be further subjected to heat relaxation treatment. For instance, the polyester support is subjected to the heat relaxation at the creep temperature.

The stretched polyester support, before provision of a photographic layer, is subjected to the heat treatment so that a free volume (strain) is relaxed. In more detail, a subbing layer is provided on the stretched polyester support to form a composite, and further the composite is subjected to the heat treatment at temperature of 50° C. to Tg for 0.1 to 1,500 hours.

The effect of the heat treatment is rapidly obtained with enhancing the temperature. Therefore, the heat treatment is generally performed in the range from a temperature 50 degree (°C.) lower than Tg to Tg, preferably in the range of (Tg−30° C.) to Tg and more preferably in the range of (Tg−20° C.) to Tg.

The effect of the heat treatment can be obtained when the treatment is performed for 0.1 hour or more. On the other hand, even when the treatment is performed for 1500 hours or more, the effect attains to the saturated condition. Hence, the heat treatment is performed for 0.1 to 1500 hours, generally for 0.5 to 1000 hours, preferably for 0.5 to 500 hours and more preferably for 10 to 100 hours.

In order to reduce the time period for the heat treatment, the film is, before the heat treatment, preferably pre-heated at the temperature higher than the glass transition temperature (Tg) for a short time and is more preferably pre-heated at the temperature between a temperature 20° C. higher than Tg and 100° C. for 5 minutes to 3 hours.

In the heat treatment, the film may be heated in the form of roll (in the state of winding) by allowing the film to stand in a house for heating, or be heated in the form of film by transforming the film into a heating zone (or passing through a heat roll). Otherwise, these heating methods may be utilized in combination. In the case of heating in the form of roll, the film is preferably wrapped with a double or triple layer using insulation such as glass fiber for preventing it from occurrence of shrinkage or wrinkles.

The core of the roll employed in the heat treatment preferably has a hollow shape, or preferably has a heater therein or a structure in which a liquid for heating can be circulated so as to effectively conduct heat into the roll. Although materials of the core are not particularly restricted, preferred are materials such as stainless and resin containing glass fiber which scarcely show decrease of mechanical strength or deformation by exposing to heat.

The heat treatment may be performed by cooling at an average cooling speed of −20° to −0.01° C./minute at the temperature from the glass transition temperature to a temperature 40° C. lower than the glass transition temperature. Further, the support is preferably slowly cooled from a temperature of (Tg+30° C.) to Tg.

By the stretched poly(ethylene-2,6-naphthalate) as the support, the resultant photographic material (film) can be rendered thin. Therefore, the film can be inserted into the patrone of a reduced size. The support generally has a thickness of 50 to 100 μm, preferably 80 to 100 μm, and more preferably 85 to 95 μm. In the case of a thickness of less than 50 μm, such a thin support is not capable of enduring the shrinkage stress of the photographic layer during drying. In the case of a thickness of more than 100 μm, such a thick support is against to the object of reducing a thickness of the support to give a compact-sized patrone or camera.

The support of poly(ethylene-2,6-naphthalate) has generally surface roughness of 0.0015 to 0.050 μm, preferably 0.0020 to 0.050 μm, more preferably 0.0025 to 0.050 μm and most preferably 0.0030 to 0.050 μm. The support having the surface roughness exhibits an improved lubricative property and bonding strength between the support and the photographic layer (or the subbing layer or the backing layer).

Further, the support generally has haze of not more than 3%, preferably not more than 2%, and more preferably not more than 1.5%. The haze of more than 3% brings about reduction of the sharpness of the resultant photographic image.

The support having the surface roughness and the above haze is advantageously prepared by introducing fine particle such as silica, silicone and crosslinked polystyrene into the support as mentioned later.

Further, the support generally has friction coefficient between the supports of not less than 0.6, preferably not less than 0.7, and more preferably not less than 0.75. When the friction coefficient less than 0.6, the film is damaged due to slipping during a rolling procedure. Further, the continuous film (sheet) is apt to slid in a winding procedure to slide off location to be wound.

The support of polyethylene-2,6-naphthalene generally contains various additives in order to render suitable for a support for a photographic material.

The polyester film is preferably treated to have lubricative property. The methods for making such film, for instance, include a method of kneading an inactive inorganic compound or a polymer into the film or a method of coating a surfactant over the film.

Preferred examples of the inactive inorganic compound or polymer include $SiO_2$ (silica), silicone and crosslinked polystyrene. In addition to the above method of adding the inactive grains to the polyester for making the film lubricant, also employable is another method of precipitating the catalyst, which is to be added to the polymerization reaction system of producing polyester, in the resultant polyester film so as to make the film lubricative due to precipitation of the internal grains.

The support of the photographic material must be transparent as its important requirement, and therefore as means for making the polyester film lubricative, it is preferred to adopt the former method in the case of adding $SiO_2$, silicone or crosslinked polystyrene which have a reflective index near to that of the polyester as mentioned above, or the latter method that enables the size of the grains precipitated in the polyester film to reduce.

The support of poly(ethylene-2,6-naphthalate) preferably contains fine particles to improve lubricative property and bonding strength between the support and the photographic layer. Therefore the support has a large number of projections on its surface. The projections are formed by dispersing a large number of the fine particles (preferably having spherical shape). The fine particle generally is at least one selected from the group consisting of silica, silicone and crosslinked polystyrene. Preferred is silica. The polyester (poly(ethylene-2,6-naphthalene)) containing the fine particles such as silica particles is prepared by adding the particles to the polyester during esterification reaction such as transesterification or polyesterification reaction of a transesterification method, or polyesterification reaction of a direct polymerization method. It is preferred to add the particles to the polyester reaction system at the initial time such as a period until the intrinsic viscosity of the system comes to approx. 0.3.

The silica particle employed for the invention generally has volume-shape coefficient (f) of 0.2 to $\pi/6$. The volume-shape coefficient (f) is represented by the following formula:

$$f = V/D^3$$

in which V is a mean volume ($\mu m^3$) per a particle and D is a mean value of maximum particle sizes. D (the mean value of maximum particle sizes) means the mean of maxima of a distance of a straight line across the particle. The volume-shape coefficient (f) preferably is in the range of 0.3 to $\pi/6$, and more preferably in the range of 0.4 to $\pi/6$. The silica particle has a real spherical shape in the case of f of $\pi/6$. The use of the particle having f of less than 0.2 does not bring about the desired surface characteristics.

The silica particle generally has a ratio of particle sizes (ratio of a major axis to a minor axis) of 1.0 to 1.2, preferably 1.0 to 1.15 and more preferably 1.0 to 1.1. The fine particle generally has a mean particle size of 0.03 to 2.5 μm, preferably 0.05 to 1.0 μm and more preferably 0.1 to 0.8 μm. The spherical silica having such dimensions differs from the known silica particles of 10 nm or the known aggregate of 0.5 μm formed by the aggregation of the silica particles.

The use of the silica particle having a particle size of less than 0.03 μm does not result in the good lubricant properties. In the case of using the silica particle having a particle size of more than 3 μm, the resultant support shows increase of haze and reduction of scratch hardness due to higher projections formed on the support.

The silica particle size (diameter of the circle having the same area as that of the particle), the major axis and the minor axis are measured by observing an image obtained by magnifying the metal-deposited surface of the particle 10,000 to 30,000 times by a microscope. Then, the mean particle size and the ratio of the major axis to the minor axis is determined according the following formulae:

$$\text{Mean particle size} = \frac{\text{Total lengths of diameters}}{\text{Number of the measured particles}}$$

$$\text{Ratio of particle sizes} = \frac{\text{Mean major axis}}{\text{Mean minor axis}}$$

The distribution of the particle size preferably has a steep curve. The distribution preferably has relative standard deviation of the particle size (which shows degree of the steep curve) of not more than 0.5, more preferably not more than 0.4 and most preferably not more than 0.3.

The relative standard deviation is represented by the following formulae:

$$\text{Relative standard deviation} = \frac{\sqrt{\sum_{i=1}^{n} \frac{(Di - Da)^2}{n}}}{Da}$$

in which Di stands for the diameter of the circle having the same area as that of each particle and Da stands for the mean value of the particle sizes;

$$Da = \frac{\sum_{i=1}^{n} Di}{n}$$

in which n is the number of the particles.

In the case that the spherical particle (preferably silica particle) having the relative standard deviation of not more than 0.5 is added to poly(ethylene-2,6-naphthalate), uniform projections (in which all heights of the projections are almost equal one another) are formed the surface of poly(ethylene-2,6-naphthalate) film. Therefore, the support having such surface shows a good lubricative property.

Various silica particles can be employed in the invention without any restriction with regard to its preparation and the like, so long as it satisfies the above-mentioned conditions.

The spherical silica particle, for example, is prepared by the steps of hydrolyzing orthoethylsilicate [Si(OC$_2$H$_5$)$_4$] to form a mono-dispersed sphere of tetrahydroxysilica [Si(OH)$_4$]; and dehydrating the mono-dispersed sphere to form silica bonds [≡Si—O—Si≡] in the direction of three dimensions (Nippon Kagaku Kaishi, 1981, No. 9, page 1503).

$$Si(OC_2H_5)_4 + 4H_2O \rightarrow Si(OH)_4 + 4C_2H_5OH \equiv Si-\!-OH + HO-\!-Si \equiv \rightarrow Si-\!-O-\!-Si \equiv + H_2O$$

The support generally contains the fine silica particle in the amount of 0.001 to 0.8 weight %, preferably in the amount of 0.005 to 0.6 weight % and more preferably in the amount of 0.01 to 0.5 weight %.

As for a silicone (silicone resin) particle employed as the fine particle, its shape is preferred to be spherical, and the distribution of the particle size preferably shows almost mono-dispersion having steep curve. Various spherical silicone particles can be employed in the invention without any restriction with regard to its preparation and the like. The spherical silicone particle preferably has a ratio (γ) of the distribution of the particle size in the range of 1.0 to 1.4. The ratio (γ) of the distribution of the particle size is represented by the following formula:

$$\gamma = D_{25}/D_{75}$$

in which D$_{25}$ represents a mean particle size (μm) at an integrating weight of 25% and D$_{75}$ represents a mean particle size (μm) at an integrating weight of 75%. The ratio (γ) preferably is in the range of 1.0 to 1.3 and more preferably in the range of 1.0 to 1.15.

The silicone particle preferably has the following formula (A):

$$R_xSiO_{2-x/2} \quad \text{(A)}$$

in which R represents a hydrocarbon group having 1 to 7 carbon atoms, and x represents a number of 1.0 to 1.2. Examples of R include an alkyl group having 1 to 7 carbon atoms, phenyl or tolyl. The alkyl group has a straight chain or a branched chain. Examples of the alkyl group include methyl, ethyl, n-propyl, iso-propyl, n-butyl, tert-butyl, n-pentyl and n-heptyl. Preferred are methyl and phenyl.

For example, the formula (A) wherein x is 1.0 has the following formula (A-1):

$$RSiO_{1.5} \quad \text{(A-1)}$$

in which R has the above defined meanings.

The formula (A-1) stands for the structure essentially composed of the following structure portion in the three-dimension structure of silicone:

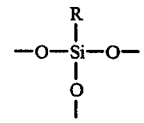

For example, the formula (A) wherein x is 1.2 has the following formula (A-2):

$$R_{1.2}SiO_{1.4} \quad \text{(A-2)}$$

in which R has the above defined meanings.

The structure represented by the formula (A-2) will be composed of the formula (A-1) of 0.2 mole and the following formula (A-3) of 0.8 mole.

$$R_{1.2}SiO \quad \text{(A-3)}$$

in which R represents the above defined meanings.

The formula (A-3) stands for the structure composed of the following structure portion in the three-dimension structure of silicone:

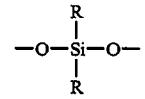

Thus, it is apparent that the structure of the silicone of the formula (A) is essentially composed of that of the formula (A-1) or is composed of those of the formula (A-1) and the formula (A-2) which are randomly bonded in appropriate proportion. In the formula (A), x is preferred to be 1.0 to 1.1.

Such silicone particle can be prepared by condensing or hydrolyzing trialkoxysilane or its partial hydrolyzed product represented by the following formula:

$$RSi(OR^1)_3$$

in which R represents a hydrocarbon group having 1 to 7 carbon atoms, and $R^1$ represents a lower alkyl group, with stirring in the presence of ammonia or amine such as methylamine, dimethylamine or ethylenediamine. The silicone particle having the formula (A-1) can be prepared in the above manner.

In the above method, the above trialkoxysilane and dialkoxysilane having the following formula:

$$R_2Si(OR^1)_2$$

in which R and $R^1$ represents the same meanings as defined above, are employed in combination to prepare the silicone particle having the formula (A-2).

As the fine particle, crosslinked polystyrene particle (preferably having spherical shape) is employable instead of the silica and silicone. The polyester (poly(ethylene-2,6-naphthalate)) containing the polystyrene particles is prepared by adding the particles to the polyester during esterification reaction such as transesterification or polyesterification reaction of a transesterification method, or polyesterification reaction of a direct polymerization method. It is preferred to add the particles to the polyester reaction system at the initial time such as a period until the intrinsic viscosity of the system comes to approx. 0.3.

The polystyrene particle, which is also preferably added to the poly(ethylene-2,6-naphthalate), has features such as (i) shape close to real sphere, (ii) reduced particle size, (iii) narrow distribution of particle size and (iv) good compatibility with polyester.

In more detail, the polystyrene particle generally has a ratio of particle sizes (ratio of a major axis to a minor axis) of 1.0 to 1.2, preferably 1.0 to 1.15 and more preferably 1.0 to 1.12. The fine particle generally has a mean particle size of 0.3 to 2.5 μm, and preferably 0.4 to 1.0 μm. The use of the polystyrene particle having a particle size of less than 0.3 μm does not result in good lubricative property or high scratch hardness of the resultant support. In the case of using the polystyrene particle having a particle size of more than 2.5 μm, the resultant support shows so high projections formed on the support and therefore is not suitable for a support for a photographic material.

The distribution of the particle size of the polystyrene particle preferably has a steep curve. The distribution preferably has relative standard deviation of the particle size (which shows degree of the steep of the curve) of not more than 0.5, more preferably not more than 0.3 and most preferably not more than 0.12.

The relative standard deviation is defined in the same manner as that of the silica or silicone particle.

In the case that the crosslinked polystyrene particle is employed as the fine particle, the resultant support has a uniform surface having projections of the almost same height due to the narrow distribution of the particle. The void between the projections on the surface of the support is small so that the shape of the projection is extremely sharp, as a result the surface shows extremely good slip properties even if a small number of the projection is present.

Various crosslinked polystyrene particles can be employed in the invention without any restriction with regard to its preparation and the like, so long as it satisfies the above-mentioned conditions.

The crosslinked polystyrene particle, for example, is obtained by the steps of preparing an emulsion of polymer particles by emulsion polymerization of at least one monomer such as styrene and a bridging agent in an aqueous medium containing a water-soluble polymer as protective colloid, collecting the polymer particles from the emulsion, grinding them by a jet-mill, and performing classification of them. Examples of the monomers include styrenes such as styrene, methylstyrene, α-methylstyrene and dichlorostyrene; and other monomers such as conjugated diene monomers (e.g., butadiene and isoprene), unsaturated nitrile-containing monomers (e.g., acrylonitrile and methacrylonitrile), (meth)acrylic acid esters (e.g., methyl methacrylate and ethyl acrylate), unsaturated carboxylic acids, hydroxy-containing monomers (e.g., hydroxyethyl methacrylate), epoxy-containing monomers (e.g., glycidyl-methacrylate) and unsaturated sulfonic acids. Examples of the bridging agents for formation of three-dimension structure include multi-functional vinyl compounds such as divinylbenzene, ethyleneglycol dimethacrylate, trimethylolpropane triacrylate and diallylphthalate. Such crosslinked polystyrene particle does not dissolve or melt in the procedure of polymerization of polyester and does not melt in the procedure of melting the polyester for formation of a film.

The crosslinked polystyrene particle is generally contained in the amount of 0.001 to 0.8 weight %, preferably contained in the amount of 0.005 to 0.6 weight %, and more preferably contained in the amount of 0.1 to 0.5 weight %, based on the weight of the polyester. The use of the polystyrene particle of less than 0.001 weight % brings about deterioration of wind-up properties in the formation of film to produce wrinkle. The use of more than 0.8 weight % results in deterioration of transparency and reduction of scratch hardness.

In the invention, the support of poly(ethylene-2,6naphthalate) may contain inactive inorganic particles other than the above particles or those which have no particle sizes thereof in combination with the above particles. Examples of the inactive inorganic particles include a) $SiO_2$; b) alumina; c) silicates containing $SiO_2$ in the amount of 30 or more weight % such as amorphous crystalline clay or mineral, aluminum silicate (including burned product or hydrate thereof), chrysotile, zircon and fly ash; d) oxides of Hg, Zn, Zr and Ti; e) sulfates of Ca and Ba; f) phosphates of Li, Ba and Ca (including primary and secondary phosphates); g) benzonates of Li, Na and K; terephthalates of Ca, Ba, Zn and Hn; i) titanates of Mg, Ca, Ba, Zn, Cd, Pb, Sr, Hn, Fe, Co and Ni; j) chromates of Ba and Pb; k) carbons such as carbon black and graphite; l) glasses such as glass powder and glass bead; m) carbonates of Ca and Mg; n) fluorite; and o) ZnS. Preferred are silica, silicate, aluminum oxide, aluminum silicate, lithium dihydrogen phosphate, lithium phosphate, sodium phosphate, calcium phosphate, barium sulfate, titanium dioxide, lithium benzonate, and double salt thereof; and glass powder, clay (including kaolin, bentonite and china clay), talc, diatomaceous earth and calcium carbonate. Particularly preferred are silica and calcium carbonate.

In the invention, it is preferred that the silica particle, silicone particle and crosslinked styrene particle are employed as particle having a relatively large size and a deposited particle produced during preparation of polyester, which scarcely produces void, is employed in combination with the particle. The support containing these particles shows an enhanced transparency and improved wind-up property.

The deposited particle is, for example, formed by adding a compound containing phosphorus to reaction system of polyester containing the above inactive inorganic compound. Examples of the compounds containing phosphorus include phosphoric acid, phosphorous acid and esters thereof such as alkyl ester and aryl ester. Further, other additives such as lithium phosphate may be introduced into the polyester for the purpose of acceleration of the formation of deposited particle, control of particle size of deposited particle and stabilization of the resultant deposited particle. The deposited particles containing calcium, lithium and phosphorus have a relatively large particle size and the deposited particles containing lithium and phosphorus have a relatively small particle size. Hence, the composition of the deposited particle is appropriately determined depending upon the desired particle size. Preferred is the composition containing lithium of 0.03 to 5 weight %, calcium of 0.03 to 5 weight % and phosphorus of 0.03 to 10 weight %.

The deposited particle generally has a mean particle size of 0.01 to 2.5 μm, preferably 0.05 to 2.0 μm, more preferably 0.1 to 1.5 μm, and most preferably 0.1 to 1.0 μm. The use of the particles of less than 0.01 μm does not show a satisfactory lubricant property and prevention of occurrence of white powder from the film, and the use of the particles of more than 2.5 μm promotes occurrence of white powder. The support preferably contains the deposited powder in the amount of 0.005 to 2.0 weight % based on the weight of the polyester, more preferably 0.01 to 0.5 weight % and most preferably 0.05 to 0.3 weight %. The use of the particles of less than 0.005 weight % does not show a satisfactory lubricative property, and the use of the particles of more than 2.0 weight % impairs evenness of the surface of the support.

Further, the deposited particle may be contain a slight amount of other metal such as Zn, Mn, Mg, Co, Sb, Ge and Ti so long as the metals do not inhibited the effect of the deposited particle.

The use of a polyester film as a support of a photographic material brings about occurrence of light-piping (i.e., edge fog) due to its high refractive index. Polyesters, particularly aromatic polyesters, have a high reflective index of 1.6 to 1.7, while gelatin, which is the essential component of a light-sensitive layer to be coated over the polyester support, has a lower refractive index of 1.50 to 1.55. Therefore, when light is incident upon the edge of such photographic film, it easily reflects on the interface between the support and the light-sensitive layer. The reflection results in a light-piping phenomenon.

In order to improve such light-piping and shading from light, dyes and pigments, which dose not noticeably increase the film haze, is preferably added into the polyester.

The dye may be employed singly or in combination. In practice, it is preferred that two or more dyes are employed to have a color of neutral gray. Examples of the dyes include dyes for polyester such as Diaresin available from Mitsubishi Chemical Industries, Ltd. and Kayaset available from Nippon Kayaku Co., Ltd. The dye is preferably added to the polyester in the increasing amount of a transmission density of not less than 0.01 and particularly preferably in the increasing amount of a transmission density of not less than 0.03.

The polyester (poly(ethylene-2,6-naphthalate)) of the invention may contain various additives to enhance the characteristics required for a photographic support.

The polyester film may contain an ultraviolet absorbent for the purpose of anti-fluorescence and of stabilization in storage, by kneading the absorbent into the film. As the ultraviolet absorbent, preferred are those having no absorption in the visible region. The amount of the absorbent generally is in the range of 0.01 to 20 weight %, and preferably is in the range of 0.05 to 10 weight %, based on the weight of the polyester. Examples of the ultraviolet absorbent include benzophenone compounds such as 2,4-dihydroxybenzophenone, 2-hydroxy-4-methoxybenzophenone, 2-hydroxy-4-n-octoxybenzophenone, 4-dodecyloxy-2-hydroxybenzophenone, 2,2',4,4'-tetrahydroxybenzophenone and 2,2'-dihydroxy-4,4'-dimethoxybenzophenone; benzotriazole compounds such as 2-(2'-hydroxy-5-methylphenyl)benzotriazole, 2-(2'-hydroxy-3',5'-di-t-butylphenyl)benzotriazole and 2-(2'-hydorxy-3'-di-t-butyl-5'-methylphenyl)benzotriazole; and salicylic acid compounds such as phenyl salicylate and methyl salicylate.

In the case that the polyester film is introduced by kneading the particles, it is preferred to further laminate a functional layer on the film to more enhance the transparency of the film. Examples of the laminating methods include co-extrusion with plural extruders and feed blocks, and co-extrusion with multi-manifold dies.

The polyester film of poly(ethylene-2,6-naphthalate) of the invention has a hydrophobic surface, and therefore it is difficult to firmly bond a photographic layer (e.g., a light-sensitive silver halide emulsion layer, an intermediate layer and a filter layer) or a subbing layer comprising a protective colloid mainly containing gelatin on the support.

Two processes are available as a conventional technique which has been tried to overcome the above difficulty:

(1) a process in which after providing a surface activation treatment such as a chemical treatment, a mechanical treatment, a corona discharge treatment, a flame treatment, a UV treatment, a high frequency wave treatment, a glow discharge treatment, an active plasma treatment, and an ozone oxidation treatment, a subbing layer is formed directly on the above-treated support by coating to obtain a high bonding strength and then a light-sensitive layer is formed on the subbing layer to obtain a high bonding strength; and (2) a process in which a subbing layer is provided without the surface treatment by coating, and then a light-sensitive layer is formed thereon.

These processes are described in U.S. Pat. No. 2,698,241, No. 2,764,520, No. 2,864,755, No. 3,462,335, No. 3,475,193, No. 3,143,421, No. 3,501,301, No. 3,460,994 and 3,674,531, British Patents No. 788,365, No. 804,005 and No. 891,469, and Japanese Patent Publications No. 48(1973)-43122 and No. 51(1976)-446.

It is assumed that any of these surface treatments is effected by forming some polar groups on a surface of a support which is originally hydrophobic and by increasing a cross linking density on a surface, and as a result, it is considered that the affinity of the components contained in a subbing layer with the polar group is increased or the bonding strength between the subbing layer and the support is enhanced. Further, various devices are given to the constitution of the subbing layer. There are a multi-layer process in which a layer bonding strongly to a support (hereinafter referred to as the first subbing layer) is provided as the first layer and a hydrophilic resin layer bonding strongly to a photographic layer is provided thereon as the second layer, and a single layer process in which only a resin layer containing both a hydrophobic group and a hydrophilic group is coated over a support.

Of the surface treatments described in above (1), the corona discharge treatment is the most known process. The treatment can be performed by the processes described in Japanese Patent Publications No. 48(1973)-5043, No. 47(1972)-51905, No. 47(1972)-28067, No. 49(1974)-83767, 51(1976)-41770 and No. 51(1976)-131576. A discharge frequency is generally 50 Hz to 5,000 kHz and preferably 5 to 100 kHz. The discharge frequency lower than 50 Hz does not bring about a stable discharge unfavorably generate a pin hole on a material to be treated. In contrast, the frequency higher than 5,000 kHz requires a specific equipment for matching impedance and unfavorably increases the cost of the machine. The treatment strength preferably is 0.001 to 5 kV·A·minute/$m^2$, more preferably 0.01 to 1 kV·A·minute/$m^2$ for the improvement in a wetting property of a plastic film such as polyester or polyolefin. A gap clearance between an electrode and a dielectric roll generally is in the range of 0.5 to 2.5 mm, and preferably in the range of 1.0 to 2.0 mm.

Further, the glow discharge treatment is the surface treatment which is most effective in many case. The process is described in Japanese Patent Publications No. 35(1960)-7578, No. 36(1961)-10336, No. 45(1970)-22004, No. 45(1970)-22005, No. 45(1970)-224040 and No. 46(1971)-43480, U.S. Pat. No. 3,057,792, No. 3,057,795, No. 3,179,482, No. 3,288,638, No. 3,309,299, No, 3,424,735, No. 3,462,335, No. 3,475,307 and No. 3,761,299, British Patents No. 997,093 and Japanese Patent Provisional Publication No. 53(1978)-129262.

With respect to the glow discharge treatment conditions, pressure generally is in the range of 0.005 to 20 Torr, and more preferably in the range of 0.02 to 2 Torr. The pressure lower than 0.02 reduces an effect of the surface treatment and the pressure higher than 20 Torr allows an excessive current to flow and therefore a spark is apt to produce. Discharge is generated by loading a high voltage between one or more pair of metal plates or metal rods arranged at the interval in a vacuum tank. This voltage has various depending on variation of a composition and pressure of an environmental gas. A stable and steady glow discharge usually takes place between 500 to 5,000 V in the above pressure range. The range of the voltage particularly suitable for improving a bonding strength is 2,000 to 4,000 V.

A discharge frequency preferably is in the range of 0 (i.e., a direct current) to several thousand MHz and more preferably in the range of 50 Hz to 20 MHz. The strength of a discharge treatment preferably is in the range of 0.01 to 5 kV·A·minute/$m^2$ and more preferably in the range of 0.15 to 1 kV·A·minute/$m^2$ because of obtaining a desired bonding strength.

The UV treatment (UV (ultra-violet) light irradiation treatment) is performed according to the known methods described in Japanese Patent Publications No. 41(1966)-10385, No. 43(1968)-2603, No. 43(1968)-2604 and No. 45(1970)-3828. A high pressure mercury vapor lamp of a main wavelength of 365 nm is generally used as the light source so long as it is accepted that the surface temperature of the support is raised to about 150° C. When irradiation under low temperature is needed, use of a low pressure mercury vapor lamp of a main wavelength of 254 nm is preferred. A high or low pressure mercury vapor lamp of ozone-free type (type producing no ozone) can be employed. The more amount of a light for the treatment improves bonding strength between the support and the layer to provided thereon, but increases coloration and brittleness of the support.

In the invention, the amount of a light generally is 20 to 10,000 mJ/$cm^2$ in the case of using the high pressure mercury vapor lamp of a main wavelength of 365 nm, and preferably 50 to 2,000 mJ/$cm^2$. The amount of a light generally is 100 to 10,000 mJ/$cm^2$ in the case of using the low pressure mercury vapor lamp of a main wavelength of 365 nm, and preferably 300 to 1,500 mJ/$cm^2$.

Previously heating of the film depresses coloration to some extent. For examples, poly(ethylene-2,6-naphthalate) is preferably heated to temperature of not higher than 190° C. Further, from the viewpoint of Tg (120° C.) and the bonding strength, it is preferred that the treatment is conducted in the range of 85° to 120° C.

The surface of the support can be heated in vacuo by the use of an infra-red heater or in contact with heat-roll. When the surface of the support is needed to raise to 100° C., the surface is in contact with the heat-roll heated at 100° C. only for 1 second to attain a temperature of 100° C.

Subsequently, the surface treatment described in (2) above is described. Examples of known materials for the first subbing layer in the multi-layer process include copolymers derived from vinyl chloride, vinylidene chloride, butadiene, methacrylic acid, acrylic acid, itaconic acid and maleic anhydride; polyethyleneimine; an epoxy resin; a grafted gelatin; nitrocellulose; halogen-containing resin such as polyvinyl bromide, polyvinyl fluoride, polyvinyl acetate, chlorinated polyethylene chlorinated polypropylene, bromated polyethylene, chlorinated rubber, vinyl chloride/ethylene copolymer vinyl chloride/propylene copolymer, vinyl chloride/styrene copolymer, isobutylene chloride containing copolymer, vinyl chloride/vinylidene chloride copolymer, vinyl chloride/styrene/maleic anhydride copolymer, vinyl chloride/styrene/acrylonitrile copolymer, vinyl chloride/butadiene copolymer, vinyl chloride/isoprene copolymer, vinyl chloride/chlorinated propylene copolymer, vinyl chloride/vinylidene chloride/vinyl acetate copolymer vinyl chloride/acrylic acid ester copolymer, vinyl chloride/maleic acid ester copolymer, vinyl chloride/methacrylic acid ester copolymer, vinyl chloride/acrylonitrile copolymer, internally plasticized poly(vinyl chloride), vinyl chloride/vinyl acetate copolymer, poly(vinylidene chloride), vinylidene chloride/methacrylic acid ester copolymer, vinylidene chloride/acrylonitrile copolymer, vinylidene chloride/acrylic acid ester copolymer, chloroethyl vinyl ether/acrylic acid ester copolymer and polychloroprene; α-olefin polymers such as polyethylene, polypropylene, polybutene, poly-3-methylbutene and poly-1,2-butadiene; copolymers such as ethylene/propylene copolymer, ethylene/vinyl ether copolymer, ethylene/propylene/1,4-hexadiene copolymer, ethylene/vinyl acetate copolymer, butadiene/propylene copolymer and butadiene/acrylonitrile copolymer, and blends of these copolymers and halogen-containing resins; acrylic resin such as methyl acrylate/acrylonitrile copolymer, ethyl acrylate/styrene copolymer, methyl methacrylate/acrylonitrile copolymer, poly(methyl methacrylate), methyl methacrylate/styrene copolymer, butyl methacrylate/styrene copolymer, polymethyl acrylate, polymethyl-α-chloroacrylate, polymethoxyethyl acrylate, polyglycidylacrylate, polybutyl acrylate, polymethyl acrylate, polyethyl acrylate, acrylic acid/butyl acrylate copolymer, acrylic acid ester/butadiene/styrene copolymer and methacrylic acid ester/butadiene/styrene copolymer; styrene containing resins such as polystyrene, poly-α-methylstyrene, styrene/dimethylfumarate copolymer, styrene/maleic anhydride copolymer, styrene/butadiene copolymer, styrene/butadiene/acrylonitrile copolymer, poly(2,6-dimethylphenleneoxide) and styrene/acrylonitrile copolymer; polyvinyl carbazole; poly(p-xylylene); polyvinyl formal; polyvinyl acetal; polyvinyl butyral; polyvinyl phthalate; cellulose triacetate; cellulose butyrate; cellulose phthalate; nylon 6; nylon 66; nylon 12; methoxymethyl-6-nylon; nylon-6,10-polycapramide; poly-N-butyl-nylon-6-polyethylene sebacate; polybutylene glutarate; polyhexamethylene adipate; polybutylene isophthalate; polyethylene terephthalate; polyethylene adipate; polyethylene adipate isophthalate; polyethylene-2,6-naphthalate; polydiethylene glycol terephthalate; polyethyleneoxybenzoate; bisphenol A isophthalate; polyacrylonitrile; biphenol A adipate; polyhexamethylene-m-benzenesulfoneamide; polytetramethylenehexamethylene carbonate; polydimethyl siloxane; polyethylene methylene-bis-4-phenylene carbonate; and bisphenol A polycarbonate (described in, for example E. H. Immergut "Polymer Handbook", Vol. IV. pages 187-231, Interscience Pub. New York, 1988).

An example of a known material for the second subbing layer include gelatin.

In the single layer process, a support is swollen and is subjected to an internal mixing with a hydrophilic polymer for the subbing layer to obtain a high bonding strength in many cases. Examples of materials for the subbing layer include a water soluble polymer, cellulose ester, a latex polymer and a water soluble polyester. Examples of materials for the water soluble polymer include gelatin, gelatin derivatives, casein, agar, sodium alginate, starch, polyvinyl alcohol, an acrylic acid-containing copolymer and a maleic anhydride-containing copolymer. Examples of materials for the cellulose ester include carboxymethyl cellulose and hydroxyethyl cellulose. Examples of materials for the latex polymer include a vinyl chloride-containing copolymer, a vinylidene chloride-containing copolymer, an acrylic acid ester-containing copolymer, a vinyl acetate-containing copolymer and a butadiene-containing copolymer. Gelatin particularly is preferred.

Examples of the compounds which swell the support include resorcin, chlororesorcin, methylresorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid and chloral hydrate. Preferred are resorcin and p-chlorophenol.

Various gelatin hardeners can be employed for the subbing layer.

Examples of the gelatin hardeners include a chromium salt (e.g., chrome alum), aldehydes (e.g., formaldehyde and glutaraldehyde), isocyanates, an active halogen compound (e.g., 2,4-dichloro-6-hydroxy-s-triazine), an epichlorohydrin resin, cyanuric acid chloride compound, a vinyl sulfone or sulfonyl compound, a carbamoyl ammonium chloride compound, amidinium salt compound, a carbodiimide compound and pyridinium salt compound.

The subbing layer may contain, as a matting agent, an inorganic fine particle such as $SiO_2$, $TiO_2$, calciume carbonate or magnesium carbonate, or a fine particle of a polymer such as polymethyl methacrylate copolymer, cellulose acetate propionate or polystyrene. The diameter of the matting agent preferably is in the range of 0.01 to 10 μm.

Further, a coating solution for forming the subbing layer may contain various additives other than the above compounds. For instance, examples of the additives include a surface active agent, an antistatic agent, an antihalation agent, a coloring dye, a pigment, a coating aid and an antifogging agent.

The coating solution for the subbing layer can be coated by known coating methods such as a dip coating method, a roller coating method, a curtain coating method, an air knife coating method, a wire bar coating method, a gravure coating method or an extrusion coating method using a hopper described in U.S. Patent No. 2,681,294. Two or more layers can be simultaneously be coated according to the processes described in U.S. Pat. No. 2,761,791, No. 3,508,947, 2,941,898 and 3,526,528.

The backing layer can employ, as a binder, a hydrophobic polymer or a hydrophilic polymer as used for the subbing layer.

The backing layer may contain an antistatic agent, a sliding agent, a matting agent, a surface active agent and a dye. Examples of the antistatic agent include anionic polymer electrolytes such as polymers containing carboxylic acid, carboxylic acid salt and sulfonic acid salt described in Japanese Patent Provisional Publications No. 48(1973)-22017, No. 51(1976)-30725, No. 51(1976)-129216 and 55(1980)-95942, and Japanese Patent Publication No. 46(1971)-24159; and cationic polymers described in Japanese Patent Provisional Publications No. 49(1974)-121523 and No. 48(1973)-91165, and Japanese Patent Publication No. 49(1974)-24582. Examples of the surface active agent include anionic or cationic surface active agents described in U.S. Pat. No. 2,992,108 and No. 3,206,312, Japanese Patent Provisional Publications No. 49(1974)-85826, No. 49(1974)-33630, No. 48(1973)-87862 and No. 55(1980)-70837, and Japanese Patent Publications No. 49(1974)-11567 and No. 49(1974)-11536.

The antistatic agent of the backing layer preferably is the fine particle of at least one crystalline metal oxide selected from ZnO, $TiO_2$, $SnO_2$, $Al_2O_3$, $In_2O_2$, $SiO_2$, MgO, BaO, $MoO_3$ and $V_2O$, or a composite metal oxide thereof. The volume resistivity of the crystalline metal oxide or composite metal oxide thereof preferably is not more than $10^7 \Omega$ cm, and more preferably not more than $10^5 \Omega$ cm. The particle size of the oxide preferably is 0.002 to 0.7 μm, and more preferably 0.005 to 0.3 μm. Use of the fine particle is preferred from the viewpoint of prevention of occurrence of static mark.

In the invention, the diameter of the spool of the cartridge (patrone) around which the photographic film is wounded, i.e., the diameter of a core that the film itself is wound up to form, the diameter generally is in the range of 3 to 12 mm. The film having the diameter less than 3 mm reduces the photographic characteristics of a light-sensitive layer and other layers due to pressure caused by bending stress of the film. Further, the diameter of photographic film preferably is in the range of 3 to 10 mm, and more preferably is in the range of 4 to 8 mm.

The silver halide photographic material of the invention is described below.

The silver halide emulsion layer may be used for either a black and white photographic material or a color photographic material. The silver halide photographic material (silver halide emulsion layer) for color photographic material is described below.

The color photographic material may have at least one of layers consisting of a red-sensitive emulsion layer, a green-sensitive emulsion layer and a blue-sensitive emulsion layer on the support. The arrangement of those layers can be optionally determined. As a typical example, there can be mentioned silver halide photographic material provided with at least one sensitive layer consisting of plural silver halide emulsion layers (which are substantially same each other in sensitivity), and the sensitive layer is a red-sensitive layer, a green sensitive layer or a blue sensitive layer. In a multi-layered silver halide color photographic material, generally, the red-sensitive layer, the green sensitive layer and the blue sensitive layer are arranged from the support side in this order. The blue-sensitive layer, the green-sensitive layer and the red-sensitive layer may be arranged in this order from the support side. Further, the blue-sensitive layer, the red-sensitive layer and the green-sensitive layer may be arranged in this order from the support side. Further, two or more emulsion layers which are sensitive to the same color but show different sensitivities can be provided to enhance the sensitivity. Three emulsion layers can be provided to improve the graininess of the image. A non-light sensitive layer such as an intermediate layer may be interposed between two or more emulsion layers having the same color sensitivity.

The intermediate layer may contain couplers or DIR compounds.

The plural silver halide emulsion layers constituting each unit light sensitive layer are described in West Germany Patent No. 1,121,470 and in U.K. Patent No. 923,045.

Silver halide grains may be regular grains having a regular crystal shape such as a cube, octahedron or tetradecahedron, those having an irregular shape such as sphere or tablet, those having a crystal defect such as twinning plane, or those having a combination of the shapes.

The silver halide grains may be either fine grains of mot more than about 0.2 μm in the diameter or giant grains having a projected area diameter or up to about 20 μm. The emulsion may be either a monodisperese emulsion or a poly-disperese emulsion.

A photographic emulsion can be prepared in accordance with a method described in Research Disclosure No. 17643 (December 1978), pp. 22-23, "I. Emulsion Preparation and Types", and ibid. No. 18716 (November 1979), page 648, "Chimie et Physique Photographique" by P. Glafkides, Paul Montel, 1967; "Photographic Emulsion Chemistry" by G. F. Duffin, Focal Press, 1966; or "Making and Coating Photographic Emulsion" by V. L. Zelikman et al., Focal Press, 1964).

Further, monodisperse emulsions as described in U.S. Pat. No. 3,574,628 and No. 3,655,394, and U.K. Patent 1,413,748 is also preferred.

A tabular silver halide grain having an aspect ratio of not less than 5 can also be employed in the invention. A tabular silver halide grain can be easily prepared in accordance with methods described in "Photographic Science and Engineering by Gutoff, vol. 14 (1970), pp. 248-257; U.S. Pat. No. 4,434,226, No. 4,414,310, No. 4,433,048, No. 4,439,520 and U.K. Patent No. 2,112,157.

The crystal structure may be either homogeneous or heterogeneous. In the heterogeneous structure, the halogen compositions positioned inside and outside are different each other. The crystalline may be of a layered structure. Some silver halides in which halogens are different each other may connect by epitaxial bond to form the crystal, or a salt other than silver halide such as silver rhodanite and lead oxide also may connect to the silver halide crystal by epitaxial bond. Mixture of grains having various crystal shapes also may be employed.

The emulsion used in the invention is usually subject to physical ripening, chemical ripening and spectral sensitization. Additives used in these process are described in Research Disclosure No. 17643 (December, 1978) and ibid., No. 18716 (November, 1979). The pages in which the additives are described are set forth below.

Known photographic additives used in the invention are also described in the above two Research Disclosures. The pages are also set forth below.

| Additives | R.D. No.17643 | R.D. No. 18716 |
|---|---|---|
| 1. Chemical Sensitizer | pp. 23 | pp. 648, right column |
| 2. Sensitivity Promoter | | same as above |
| 3. Spectral Sensitizer, Supersensitizer | pp. 23-24 | pp. 648, right column - 649, left column |
| 4. Brightening Agent | pp. 24 | |
| 5. Antifogging Agent and Stabilizer | pp. 24-25 | pp. 649, right column |
| 6. Light Absorber, Filter Dye, and U.V. Absorber | pp. 25-26 | pp. 649, right column - 650, left column |
| 7. Color Stain Inhibitor | pp. 25, right | pp. 650, left column - right column |
| 8. Dye Image Stabilizer | pp. 25 | |
| 9. Hardening Agent | pp. 26 | pp. 651, left column |
| 10. Binder | pp. 26 | same as above |
| 11. Plasticizer, Lubricant | pp. 27 | pp. 650, right column |
| 12. Coating Aid, and Surface Active Agent | pp. 26-27 | same as above |
| 13. Antistatic Agent | pp. 27 | same as above |

To inhibit deterioration in photographic properties caused by formaldehyde gas, a compound capable of reacting with and solidifying formaldehyde as disclosed in U.S. Pat. No. 4,411,987 and No. 4,435,503 can be preferably incorporated into the light sensitive material.

Various color couplers can be used for the invention. Concrete examples of the couplers are described in the patents cited in *Research Disclosure* No. 17643, VII C-G.

As a yellow coupler, preferred are those described in, for example, U.S. Pat. No. 3,933,501, No. 3,973,968, 4,022,620, No. 4,326,024, No. 4,401,752, No. 4,248,961, 4,314,023 and No. 4,511,649, Japanese Patent Publication No. 58(1983)-10739, U.K. Patents No. 1,425,020 and No. 1,476,760, and European Patent No. 249,473A.

As magenta couplers, 5-pyrazolone type and pyrazoloazole type compounds are preferred, and particularly preferred are those described in U.S. Pat. No. 4,310,619 and No. 4,351,897, European Patent No. 73,636, U.S. Pat. No. 3,061,432 and No. 3,725,067, *Research Disclosure* No. 24220 (June, 1984), Japanese Patent Provisional Publication No. 60(1985)-33552, *Re-*

*search Disclosure* No. 24230 (June, 1984), U.S. Pat. No. 4,500,630, No. 4,540,654 and No. 4,556,630, and WO(PCT)88/04795.

As cyan couplers, there can be mentioned phenol type and naphthol type couplers, and preferred examples are those described in U.S. Pat. No. 4,052,212, No. 4,146,396, No. 4,228,233, No. 4,296,200, No. 2,369,929, No. 2,801,171, No. 2,772,162, No. 2,895,826, No. 3,772,002, No. 3,758,308, No. 4,334,011 and No. 4,327,173, West German Patent Publication No. 3,329,729, European Patents No. 121,365A and No. 249,453A, and U.S. Pat. No. 3,446,622, No. 4,333,999, No. 4,753,871, No. 4,451,559, No. 4,427,767, No. 4,690,889, No. 4,254,212 and No. 4,296,199.

A colored coupler may be used to compensate incidental absorption of a formed dye. The colored coupler is described in *Research Disclosure* No. 17643, VII-G, U.S. Pat. No. 4,163,670, U.S. Pat. No. 4,004,929 and No. 4,138,258, and U.K. Patent No. 1,146,368.

As couplers which give a color developing dye exhibiting a proper diffusion, preferred are those described in U.S. Pat. No. 4,366,237, U.K. Patent No. 2,125,570, European Patent No. 96,570, and West German Patent Publication No. 3,234,533.

Typical examples of polymerized dye-forming couplers are described in U.S. Pat. No. 3,451,820, No. 4,080,211, No. 4,367,282, No. 4,409,320 and No. 4,576,910, and U.K. Patent No. 2,102,173.

A coupler which releases a photographically useful residue in accordance with a coupling reaction can be also used in the invention. A DIR coupler which releases a development inhibitor is employable. The DIR coupler is described in *Research Disclosure* No. 17643, VII-F and U.S. Pat. No. 4,248,962.

A coupler which imagewise releases a nucleating agent or a development accelerator in a development process is also available. This coupler is described in U.K. Patents No. 2,097,140 and No. 2,131,188.

Examples of other couplers employable for the photographic material of the invention include a competing coupler, a polyvalent coupler, a DIR redox compound-releasing coupler, a DIR coupler-releasing coupler, a DIR coupler-releasing redox compound, a DIR redox-releasing redox compound, a coupler which releases a dye having restoration to original color after an elimination reaction, a bleach accelerator-releasing coupler and a coupler which releases ligand.

The couplers can be introduced into the photographic material by various known dispersing methods.

Examples of a high-boiling solvent used in an O/W dispersing method are described in U.S. Pat. No. 2,322,027.

Examples of the high-boiling organic solvent having a boiling point of not lower than 175° C. under a normal pressure used in the O/W dispersing method include phthalates (e.g., dibutyl phthalate, dicyclohexyl phthalate, di-2-ethylhexyl phthalate, decyl phthalate, bis(2,4-di-t-amylphenyl)phthalate, bis(2,4-di-t-amylphenyl)isophthalate, bis(1,1-diethylpropyl)phthalate); esters of phosphoric acid or phosphoric acid (e.g., triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, di-2-ethylhexylphenyl phosphate); benzoates (e.g., 2-ethylhexyl benzoate, dodecyl benzoate, 2-ethylhexyl-p-hydroxybenzoate); amides (e.g., N,N-diethyldodecanamide, N,N-diethyllaurylamide, N-tetradecylpyrrolidone); alcohols or phenols (e.g., isostearyl alcohol, 2,4-di-tert-amylphenol); aliphatic carboxylic esters (e.g., bis(2-ethylhexyl)sebacate, dioctyl azelate, glycerol tributylate, isostearyl lactate, trioctyl citrate); aniline derivatives (e.g., N,N-dibutyl-2-butoxyl-5-tert-octylaniline); and hydrocarbons (e.g., paraffin, dodecyl benzene, diisopropyl naphthalene). An organic solvent having a boiling point of not lower than about 30° C. preferably in the range of 50° C. to about 160° C. can be used as an auxiliary solvent. Examples of the auxiliary solvent include ethyl acetate, butyl acetate, ethyl propionate, methyl ethyl ketone, cyclohexanone, 2-ethoxyethyl acetate and dimethylformamide.

A process of a latex dispersing method, effects thereof and concrete examples of latex for impregnation are described in U.S. Pat. No. 4,199,363, West German Patent Applications (OLS) No. 2,541,274 and No. 2,541,230.

In the photographic material, the total thickness of all hydrophilic colloid layers on the emulsion side is preferably not more than 28 μm. The film swelling rate ($T_{\frac{1}{2}}$) is preferably not more than 30 seconds. The film thickness is determined after being stored at a temperature of 25° C. and a relative humidity of 55% for two days. The film swelling rate ($T_{\frac{1}{2}}$) can be determined by a known method in the art, for example, by using a swellometer of the type as described in A. Green et al, "Photographic Science and Engineering", Vol. 19, No. 2. pp. 124–129. $T_{\frac{1}{2}}$ is defined as the time taken until half the saturated film thickness is 90% of the maximum swollen film thickness reached when the photographic material is processed with a color developer at a temperature of 30° C. over 195 seconds.

In the invention, formation of perforations on the photographic film (silver halide photographic material), for example, is performed according to the methods as described in Japanese Patent Provisional Publications No. 57(1982)-41195, No. 61(1986)-214999, No. 62(1987)-136399, No. 1(1989)-271197, No. 3(1991)-239497 and No. 2(1990)-269598, and Japanese Patent Publications No. 1(1989)-210299. The performations are formed on one or both side of the photographic film if necessary.

The present invention is further described by the following examples.

The measuring methods used in the example are explained below.

(1) Young's Modulus

A strip specimen having a width of 10 mm and a length of 150 mm was attached to a universal tensile testing machine of Instron type at a distance between the fixtures of 100 mm. Then, the specimen was stretched at a tensile speed of 10 mm/minute and a chart-feeding speed of 500 mm/minute. The Young's modulus was determined based on the resultant load-elongation curve.

(2) Breaking Elongation (%)

In the measuring method of the Young's modulus, the specimen was stretched at a tensile speed of 200 mm/minute instead of 10 mm/minute and the stretching was continued until the specimen was broken. A length of the specimen when it was broken was measured to calculate the breaking elongation according to the following formula.

Breaking elongation =

$$\frac{\text{(length when broken)} - \text{(original length)}}{\text{(original length)}} \times 100$$

(3) Surface Roughness (Ra)

The surface roughness (Ra) is defined as a mean roughness in center line in JIS-B0601. The surface roughness was measured using a contact finger type surface roughness measuring device (SURFCORDER SE-30C available from Konishi Research Co., Ltd.). The measuring conditions were as follows:
  (a) radius of edge of finger: 2 μm
  (b) pressure: 30 mg
  (c) cut-off: 0.25 mm
  (d) measured length: 0.5 mm Measurement was performed five times as to one specimen. Four data were obtained by removing the maximum datum from the five data. Surface roughness was regarded as an average of the four data, the average being rounded off to four places of decimals to calculate down to three places of decimals.

(4) Frictional Coefficient

Double-ply film (two films) was placed on an even glass. A rubber plate was placed on the film and a load was further placed on the rubber plate. Under pressure between the films of 2 g/cm², the films was slide each other at a speed of 20 mm/minute, to measure frictional force. Frictional coefficient was calculated based on the frictional force when the film was slide by 5 mm.

(5) Tear Transmission Resistance

The tear transmission resistance was measured using a light load type tear tester (available from Toyo Seiki Co., Ltd.) according to ASTM-D-1922. A strip specimen of 51×64 mm having notch of 13 mm was attached to the tester to read a value which the tester indicated when 51 mm (64−13 mm) of the reminder was torn.

When the film of the value of not more than 300 was charged in a camera to be employed, the film is easily torn from the edge of the perforation on feeding or wind-up of the film.

(6) Core-set

The core-set means formation of a curling tendency by rolling a film on a spool. The core-set was performed under the conditions (temperature and hour) set forth in Tables 2-A and 3-A.

(7) Core-set Curl

The core-set curl means the curling tendency in a lengthwise direction formed by the core set. The degree of the curling tendency was measured according to Test Method A of ANSI/ASC PH1.29-1985 and expressed in terms of 1/R [m] (R is a radius of the curl).

(8) Particle Size

The particle size of spherical silica was determined as follows:

The silica particles were uniformly scattered over a plate for a sample of an electron microscope, the particles being not on top of other. A deposited gold layer of 20 to 30 nm was formed on the plate having the silica particles by the use of a sputtering machine for gold. The layer was observed at 10,000 to 30,000 times using a scanning electron microscope to measure maximum diameters (Dli), minimum diameters and diameters of the circle corresponding to the particle as to at least 100 particles using Luzex 500 (available from Nippon Regulator Co., Ltd.). Then, the maximum diameter (D1), minimum diameter (Ds) and mean particle size (Da) were calculated from the following formulae:

$$Dl = \frac{\sum_{i=1}^{n} Dli}{n}$$

$$Ds = \frac{\sum_{i=1}^{n} Dsi}{n}$$

$$Da = \frac{\sum_{i=1}^{n} Di}{n}$$

(9) Relative Standard Deviation

A centrifugal sedimentation curve of the particles was determined using a centrifugal particle size analyzer (CP-50 available from Shimadzu Seisakusho, Ltd.). An integrating curve (showing a relationship of a particle size and the existing amount) was determined based on the centrifugal sedimentation curve. From the integrating curve, a distribution of difference of sizing was determined. The relative standard deviation was calculated according the following formula:

$$\frac{\sqrt{\sum_{i=1}^{n}(Di - Da)^2 \phi i}}{Da}$$

in which Di stands for each particle size (the diameter of the circle having the same area as that of each particle), Da stands for the mean value of particle sizes, n stands for a divided number of the integrating curve and φi stands for existing probability of each particle size.

EXAMPLES 1-24 AND COMPARISON EXAMPLES 1-21

1) Preparation of the Support

To a commercially available poly(ethylene-2,6-naphthalate) (homopolymer) was added 0.05 weight % of spherical silica (mean particle size: 0.5 μm; relative standard deviation: 0.09; volume-shape coefficient: 0.5) to be mixed and the mixture was dried at 170° C. for 4 fours. The mixture was melted and then extruded according a known method. The extruded film was stretched in a lengthwise direction at 150° C. at speed of 50%/sec., and stretched in a widthwise direction at 140° C. at speed of 50%/sec. (the stretching magnifications are set forth in Tables 2-A and 3-A), and then was subjected to heat setting (the temperature and period time are set forth in Tables 2-A and 3-A), whereby the film having the thickness of 90 μm was obtained.

The supports obtained in all Examples and Comparison Examples showed hazes of 0.9 to 1.5 and frictional coefficients of 0.75 to 0.90.

2) Surface Treatment of Support

Glow Discharge Treatment

Four cylindrical stainless steel rods (electrodes) having a diameter of 3 cm and a length 40 cm were fixed at intervals of 10 cm on an insulating panel. This electrode panel was fixed in a vacuum room. A 30 cm-wide support sample having was fed so as to be subjected to the treatment for 2 seconds at a distance of 15 cm over the surface (panel) of the electrode panel. Just before the treatment, the support was heated to 100° C. The glow discharge treatment was performed under reduced pressure of 0.2 Torr at an output of 3,000 V and an electrode current of 0.4 A.

Corona Discharge Treatment

The both surfaces of each of the supports were subjected to corona discharge treatment and a subbing layer was then coated on one surface side of the support which has a higher temperature during the stretching procedure. As a corona-discharging treatment, Solid State Corona Processor 6 KVA Model (manufactured be Piller Co.) was employed. A 30 cm-wide support sample was processed by the Processor at a speed of 20 m/minute. Based on the current and the voltage values as read out from the processor during the treatment, the sample was subjected to the treatment of 0.375 kV·A·min./m². The discharging frequency for the treatment was 9.6 KHz, and the gap clearance between the electrode and the dielectric roll was 1.6 mm.

UV Treatment

A UV ray was irradiated from a distance of 20 cm for 30 seconds, using a high pressure mercury vapor lamp of 1 kW, on the surfaces of the supports.

3) Provision of Subbing Layer

The resultant supports were subjected to heat treatment set forth in Tables 2-A and 3-A before a subbing layer was coated on each of the supports. The heat treatment was effected on the support (film) around a 30 cm diameter core with its subbing layer side outside.

The coating solution for a subbing layer having the following composition was coated on the treated surface of the support in the coated amount of 10 ml/m².

| Subbing Layer Composition: | |
|---|---|
| Gelatin | 1.0 weight part |
| Salicylic acid | 0.3 weight part |
| Formaldehyde | 0.05 weight part |
| p-$C_9H_{19}C_6H_4O(CH_2CH_2O)_{10}H$ | 0.1 weight part |
| Distilled water | 2.2 weight parts |
| Methanol | 96.35 weight parts |

4) Provision of Back Layer

The back layer of the following composition was coated on the sides opposite to the sides of the supports.

4-1) Preparation of a Conductive Fine Particle Dispersion (tin oxide-antimony oxide composite dispersing solution)

230 parts by weight of stannic chloride and 23 parts by weight of antimony trichloride were dissolved in 3,000 parts by weight of ethanol to obtain a homogeneous solution. 1N sodium hydroxide aqueous solution was dropped the solution until pH of the above solution becomes 3 to obtain the coprecipitate of colloidal stannic oxide and antimony oxide. The coprecipitate was left standing at 50° C. for 24 hours to obtain a red brown colloidal precipitate.

The red brown colloidal precipitate was separated by centrifugation. Water was added to the precipitate to wash it by centrifugation in order to remove excessive ions. This operation was repeated three times to remove the excessive ions.

200 parts by weight of the colloidal precipitate from which the excessive ions were removed was dispersed once again into 1,500 parts by weight of water, and the dispersion was sprayed into a kiln heated to 600° C., whereby the bluish fine particle powder of the tin-oxide-antimony oxide having the average particle size of 0.1 µm was obtained. The volume resistivity of the particle was 25Ω cm.

After the mixed solution of 40 parts by weight of the above fine particle powder and 60 parts by weight of water was adjusted to pH 7.0 and roughly dispersed with a stirrer, it was dispersed with a horizontal type sand mill (Daino mill manufactured by WILLYA BACHOFENAG) until the staying time became 30 minutes to prepare the prescribed dispersing solution.

4-2) Preparation and Provision of Backing Layer

The following composition [A] was coated on the support so as to have a dry layer thickness of 0.3 µm and dried at 115° C. for 60 seconds. The following coating solution for covering [B] was further coated thereon to have a dry layer thickness of 0.1 µm and dried at 115° C. for 3 minutes.

| Composition [A]: | |
|---|---|
| Above conductive fine particle dispersion | 10 weight parts |
| Gelatin | 1 weight part |
| Water | 27 weight parts |
| Methanol | 60 weight parts |
| Resorcin | 2 weight parts |
| Polyoxyethylene nonylphenyl ether | 0.01 weight part |
| Composition B: | |
| Cellulose triacetate | 1 weight part |
| Acetone | 70 weight parts |
| Methanol | 15 weight parts |
| Dichloromethylene | 10 weight parts |
| p-Chlorophenol | 4 weight parts |
| Silica particle (mean particle size: 0.2 µm) | 0.01 weight part |
| Polysiloxan | 0.005 weight parts |
| $C_{15}H_{31}COOC_{40}H_{81}$/ $C_{50}H_{101}O(CH_2CH_2O)_{16}H$ (8/2 weight ratio, mean particle size: 20 nm, dispersion) | 0.01 weight parts |

5) Provision of the Light-sensitive Layer

Subsequently, light sensitive layers having the following compositions were coated on the subbing layer, in order, to form a multi-layer color light-sensitive material.

Composition of Light Sensitive Layers

Materials used for the light-sensitive layers are classified as follows:
 ExC: Cyan coupler
 UV: UV absorber
 ExM: Magenta coupler
 HBS: High boiling solvent
 ExY: Yellow coupler
 H: Gelatin hardener
 ExS: Sensitizing dye The composition and its amount (g/m²) of each of the layers set forth below. The amount of each component means the coating amount. The values for the silver halide emulsion mean the coating amount of silver. As for the sensitizing dyes, the coating amount per mole of the silver halide in the same layer is shown in terms of mole.

| The first layer (antihalation layer): | |
|---|---|
| Black colloidal silver | 0.18 |
| Gelatin | 1.40 |
| ExM-1 | 0.18 |
| ExF-1 | $2.0 \times 10^{-3}$ |
| HBS-1 | 0.20 |
| The second layer (intermediate layer): | |

| | |
|---|---|
| Emulsion G | silver: 0.065 |
| 2,5-Di-t-pentadecylhydroquinone | 0.18 |
| ExC-2 | 0.020 |
| UV-1 | 0.060 |
| UV-2 | 0.080 |
| UV-3 | 0.10 |
| HBS-1 | 0.10 |
| HBS-2 | 0.020 |
| Gelatin | 1.04 |
| The third layer (low-sensitivity red sensitive emulsion layer): | |
| Emulsion A | silver: 0.25 |
| Emulsion B | silver: 0.25 |
| ExS-1 | $6.9 \times 10^{-5}$ |
| ExS-2 | $1.8 \times 10^{-5}$ |
| ExS-3 | $3.1 \times 10^{-4}$ |
| ExC-1 | 0.17 |
| ExC-3 | 0.030 |
| ExC-4 | 0.10 |
| ExC-5 | 0.020 |
| ExC-7 | 0.0050 |
| ExC-8 | 0.010 |
| Cpd-2 | 0.025 |
| HBS-1 | 0.10 |
| Gelatin | 0.87 |
| The fourth layer (middle-sensitivity red sensitive emulsion layer): | |
| Emulsion D | silver: 0.70 |
| ExS-1 | $3.5 \times 10^{-4}$ |
| ExS-2 | $1.6 \times 10^{-5}$ |
| ExS-3 | $5.1 \times 10^{-4}$ |
| ExC-1 | 0.13 |
| ExC-2 | 0.060 |
| ExC-3 | 0.0070 |
| ExC-4 | 0.090 |
| ExC-5 | 0.025 |
| ExC-7 | 0.0010 |
| ExC-8 | 0.0070 |
| Cpd-2 | 0.023 |
| HBS-1 | 0.010 |
| Gelatin | 0.75 |
| The fifth layer (high-sensitivity red sensitive emulsion layer): | |
| Emulsion E | silver: 1.40 |
| ExS-1 | $2.4 \times 10^{-4}$ |
| ExS-2 | $1.0 \times 10^{-4}$ |
| ExS-3 | $3.4 \times 10^{-4}$ |
| ExC-1 | 0.12 |
| ExC-3 | 0.045 |
| ExC-6 | 0.020 |
| ExC-8 | 0.025 |
| Cpd-2 | 0.050 |
| HBS-1 | 0.22 |
| HBS-2 | 0.10 |
| Gelatin | 1.20 |
| The sixth layer (Intermediate layer): | |
| Cpd-1 | 0.10 |
| HBS-1 | 0.50 |
| Gelatin | 1.10 |
| The seventh layer (low-sensitivity green sensitive emulsion layer): | |
| Emulsion C | silver: 0.35 |
| ExS-4 | $3.0 \times 10^{-5}$ |
| ExS-5 | $2.1 \times 10^{-4}$ |
| ExS-6 | $8.0 \times 10^{-4}$ |
| ExM-1 | 0.010 |
| ExM-2 | 0.33 |
| ExM-3 | 0.086 |
| ExY-1 | 0.015 |
| HBS-1 | 0.30 |
| HBS-3 | 0.010 |
| Gelatin | 0.73 |
| The eighth layer (middle-sensitivity green sensitive emulsion layer): | |
| Emulsion D | silver: 0.80 |
| ExS-4 | $3.2 \times 10^{-5}$ |
| ExS-5 | $2.2 \times 10^{-4}$ |
| ExS-6 | $8.4 \times 10^{-4}$ |
| ExM-2 | 0.13 |
| ExM-3 | 0.030 |
| ExY-1 | 0.018 |
| HBS-1 | 0.16 |
| HBS-3 | $8.0 \times 10^{-3}$ |
| Gelatin | 0.90 |
| The ninth layer (high-sensitivity green sensitive emulsion layer): | |
| Emulsion E | silver: 1.25 |
| ExS-4 | $3.7 \times 10^{-5}$ |
| ExS-5 | $8.1 \times 10^{-5}$ |
| ExS-6 | $3.2 \times 10^{-4}$ |
| ExC-1 | 0.010 |
| ExM-1 | 0.030 |
| ExM-4 | 0.040 |
| ExM-5 | 0.019 |
| Cpd-3 | 0.040 |
| HBS-1 | 0.25 |
| HBS-2 | 0.10 |
| Gelatin | 1.44 |
| The tenth layer (yellow filter layer) | |
| Yellow colloidal silver | silver: 0.030 |
| Cpd-1 | 0.16 |
| HBS-1 | 0.60 |
| Gelatin | 0.60 |
| The seventh layer (low-sensitivity blue sensitive emulsion layer): | |
| Emulsion C | silver: 0.18 |
| ExS-7 | $8.6 \times 10^{-4}$ |
| ExY-1 | 0.020 |
| ExY-2 | 0.22 |
| ExY-3 | 0.50 |
| ExY-4 | 0.020 |
| HBS-1 | 0.28 |
| Gelatin | 1.10 |
| The twelfth layer (middle-sensitivity blue sensitive emulsion layer): | |
| Emulsion D | silver: 0.40 |
| ExS-7 | $7.4 \times 10^{-4}$ |
| ExC-7 | $7.0 \times 10^{-3}$ |
| ExY-2 | 0.050 |
| ExY-3 | 0.10 |
| HBS-1 | 0.050 |
| Gelatin | 0.78 |
| The thirteenth layer (high-sensitivity blue sensitive emulsion layer): | |
| Emulsion F | silver: 1.00 |
| ExS-7 | $4.0 \times 10^{-4}$ |
| ExY-2 | 0.010 |
| ExY-3 | 0.010 |
| HBS-1 | 0.070 |
| Gelatin | 0.86 |
| The fourteenth layer (first protective layer): | |
| Emulsion G | silver: 0.20 |
| UV-4 | 0.11 |
| UV-5 | 0.17 |
| HBS-1 | 0.050 |
| Gelatin | 1.00 |
| The fifteenth layer (second protective layer): | |
| H-1 | 0.40 |
| B-1 (diameter: 1.7 μm) | 0.050 |
| B-2 (diameter: 1.7 μm) | 0.10 |
| B-3 | 0.10 |
| S-1 | 0.20 |
| Gelatin | 1.20 |

To each layer, the compounds of W-1 to W-3, B-4 to B-6, F-1 to F-17, an iron salt, a lead salt, a gold salt, a platinum salt, an iridium salt and a rhodium salt were appropriately incorporated, in order to improve preservation performance, processing performance, antipressure performance, antimold and fungicidal performance, antistatic performance, and coating performance.

Emulsion composition used in each layer set forth in Table 1.

TABLE 1

| | mean AgI content (%) | mean grain size (μm) | coefficient of variation (%) | diameter/thickness | silver ratio [core/middle/shell] (AgI content) | grain structure/form |
|---|---|---|---|---|---|---|
| A | 4.0 | 0.45 | 27 | 1 | [1/3](13/1) | double/octahedron |
| B | 8.3 | 0.70 | 14 | 1 | [3/7](25/2) | double/octahedron |
| C | 2.0 | 0.55 | 25 | 7 | — | even/tabular |
| D | 9.0 | 0.65 | 25 | 6 | [12/59/29] (0/11/8) | triple/tabular |
| E | 9.0 | 0.85 | 23 | 5 | [8/59/33] (0/11/8) | triple/tabular |
| F | 14.5 | 1.25 | 25 | 3 | [37/63](34/3) | double/tabular |
| G | 1.0 | 0.07 | 15 | 1 | — | even/tabular |

In Table 1;

(1) Emulsions A to F were subjected to a reduction sensitization with thiourea dioxide and thiosulfonic acid in the preparation of the grains according to the examples described in Japanese Patent Provisional Publication No. 2-191938.

(2) Emulsions A to F were subjected to a gold sensitization, a sulfur sensitization and a selenium sensitization in the presence of the spectral sensitizing dyes described in the respective layers and sodium thiocyanate according to the examples of Japanese Patent Provisional Publication No. 3-237450.

(3) Low molecular weight gelatin was used in the preparation of the tabular grains according to the examples described in Japanese Patent Provisional Publication No. 1-158426.

(4) The dislocation lines described in Japanese Patent Provisional Publication No. 3-237450 were observed in the tabular grains and regular crystal grains having a grain structure with a high pressure electron microscope.

The abbreviations of the components used in the respective layers mean the following compounds:

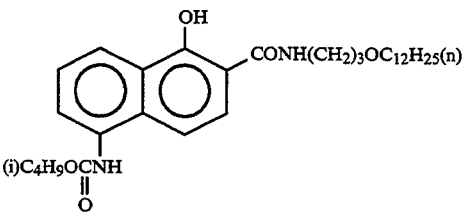

ExC-1

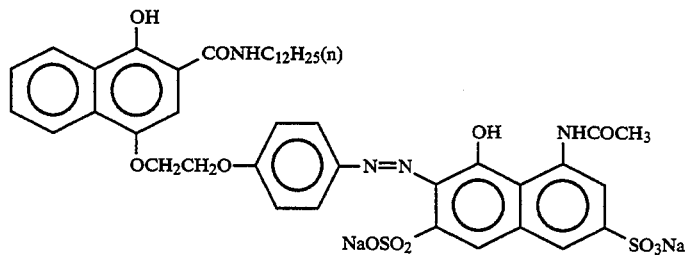

ExC-2

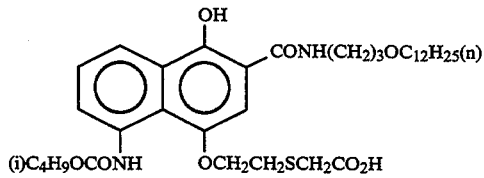

ExC-3

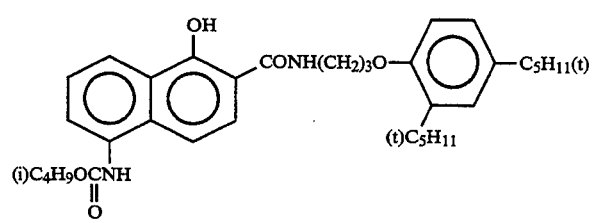

ExC-4

-continued
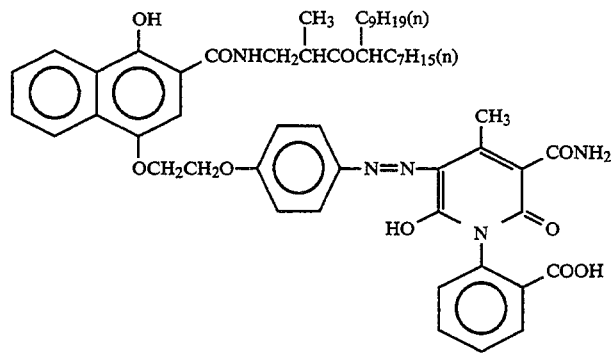
ExC-5
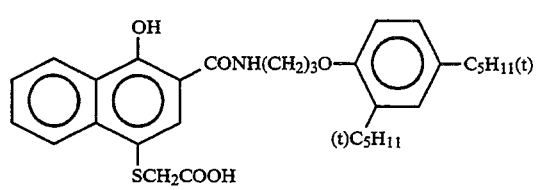
ExC-6
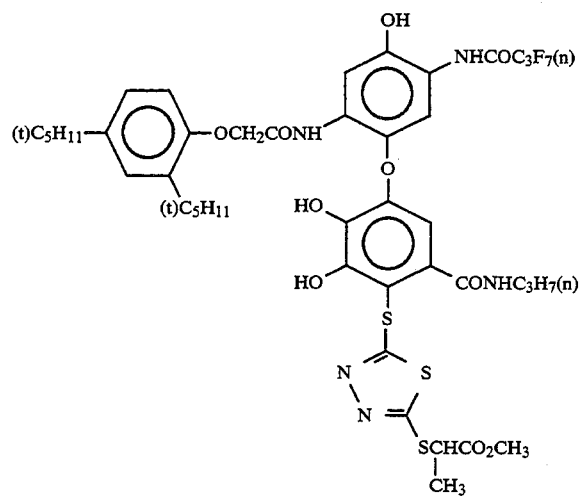
ExC-7
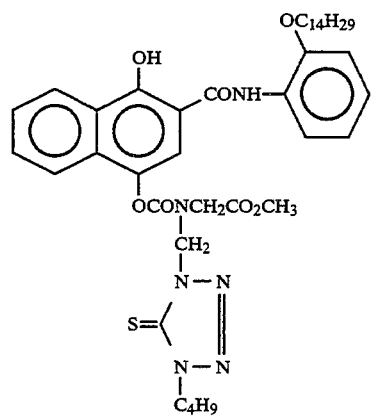
ExC-8

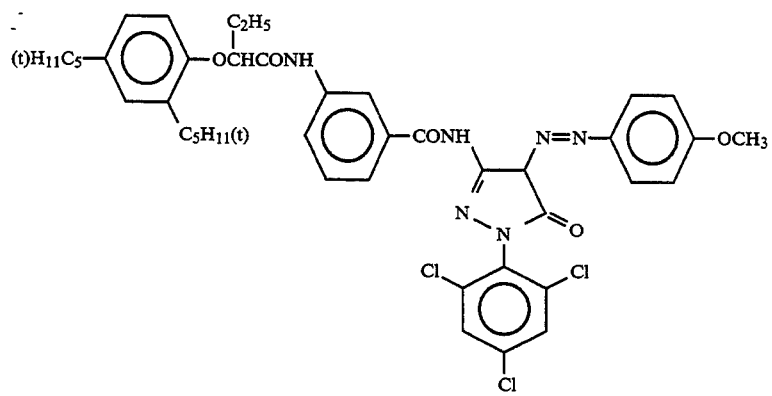
ExM-1
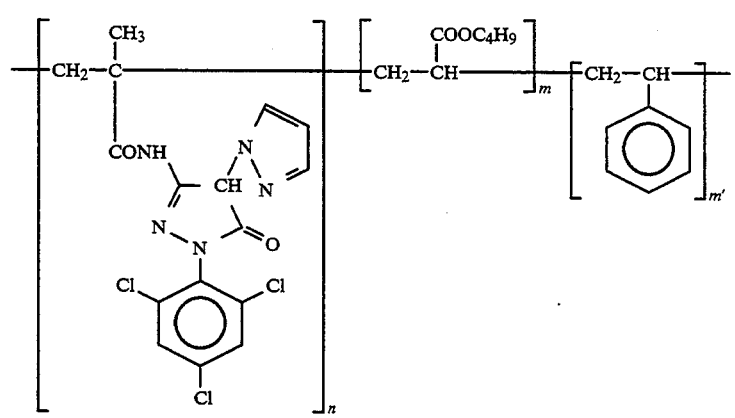
ExM-2
n = 50, m = 25, m' = 25, mol. wt. = approx. 20.000
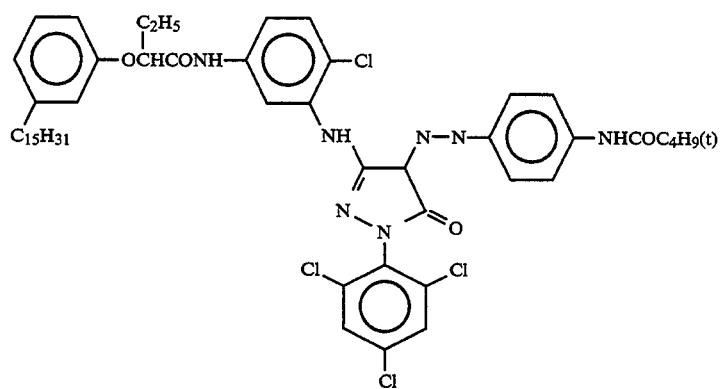
ExM-3
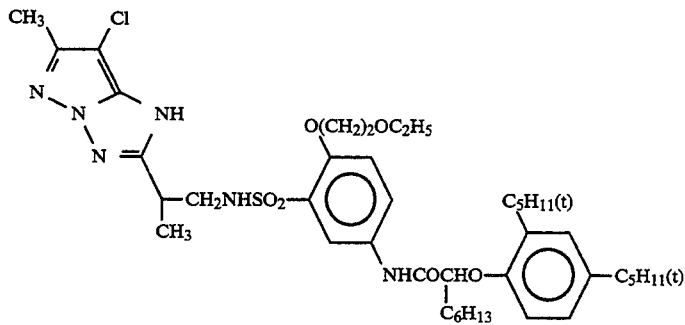
ExM-4

-continued
ExM-5
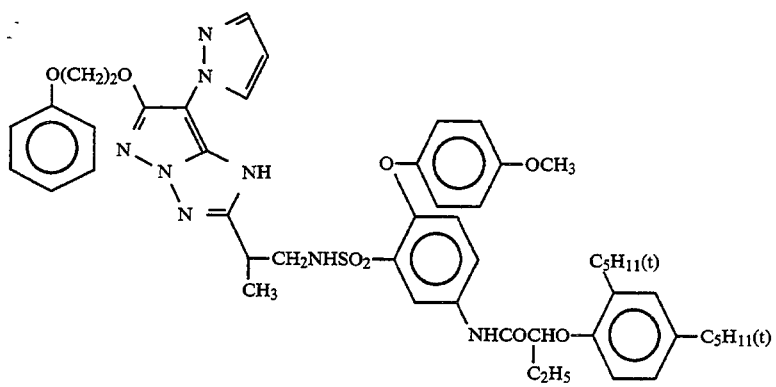
ExY-1
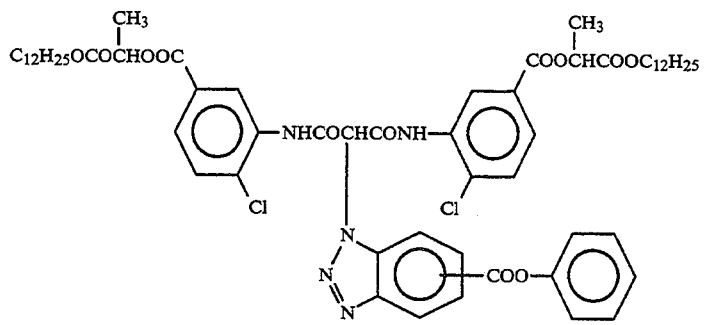
ExY-2
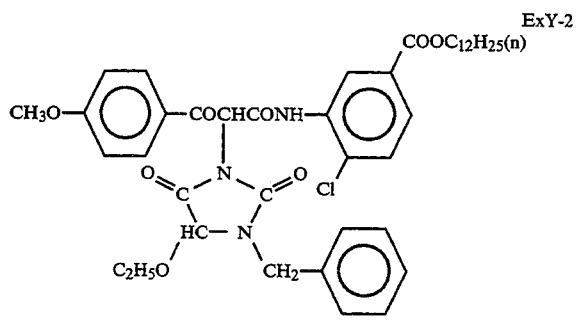
ExY-3
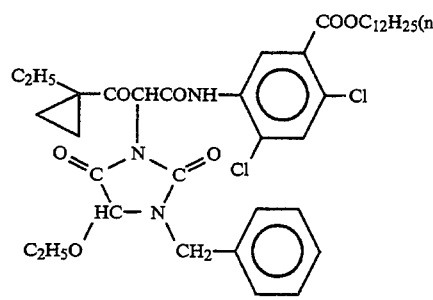
ExY-4
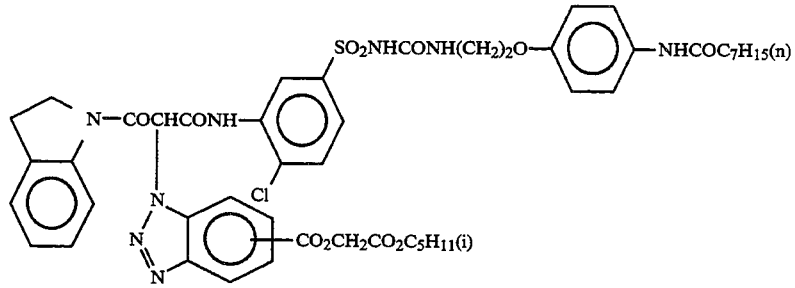
ExF-1
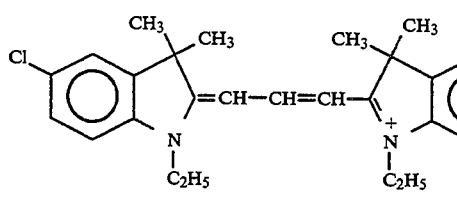
Cpd-1
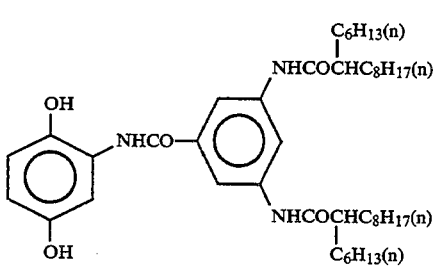

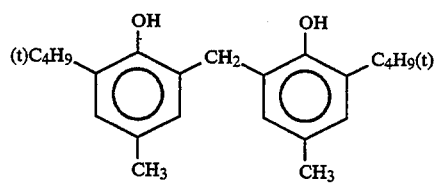
Cpd-2
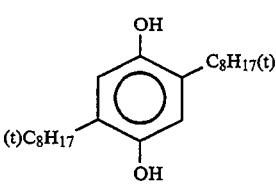
Cpd-3
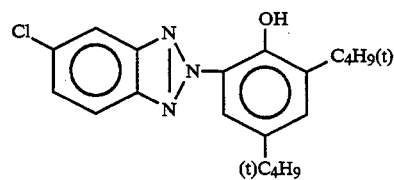
UV-1
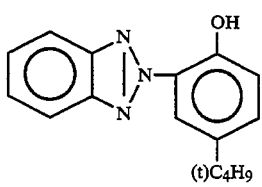
UV-2
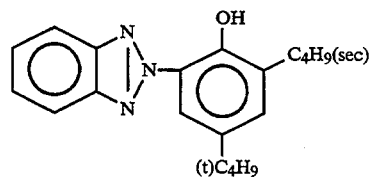
UV-3
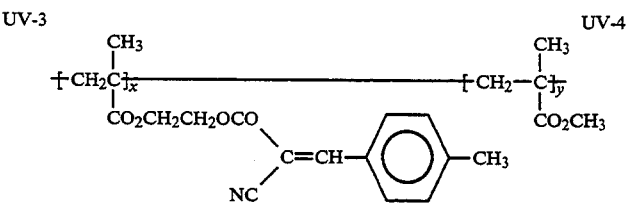
UV-4
x:y = 70:30 (weight %)
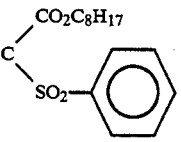
UV-5
Tricresyl phosphate  HBS-1
Di-n-butyl phthalate  HBS-2
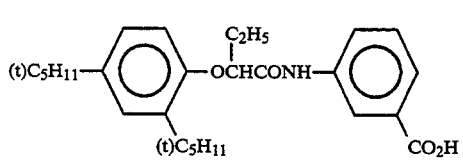
HBS-3
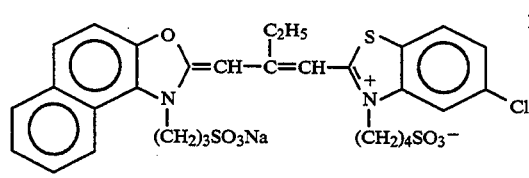
ExS-1
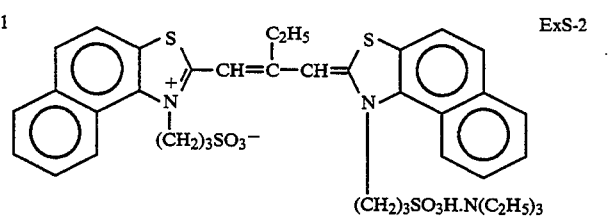
ExS-2
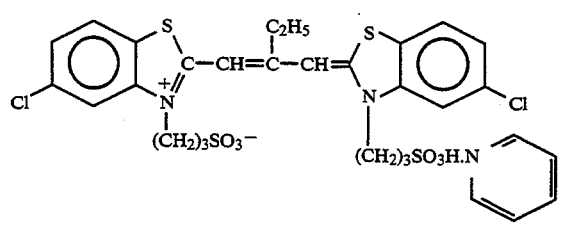
ExS-3
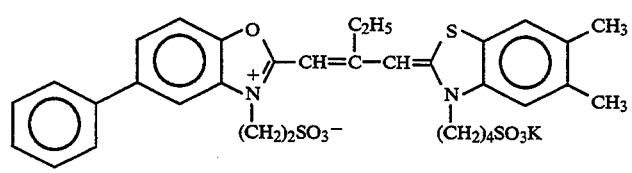
ExS-4

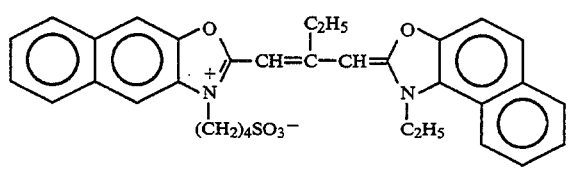 ExS-5
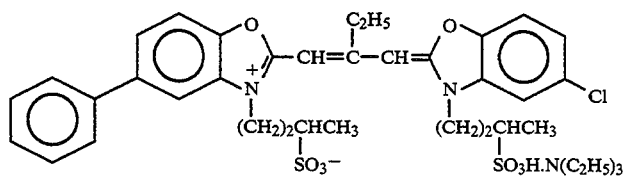 ExS-6
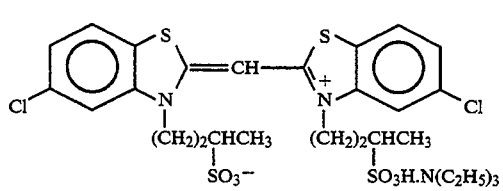 ExS-7
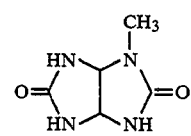 S-1
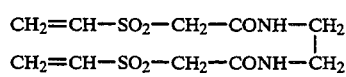 H-1
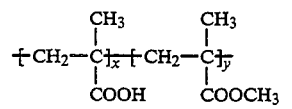 B-1
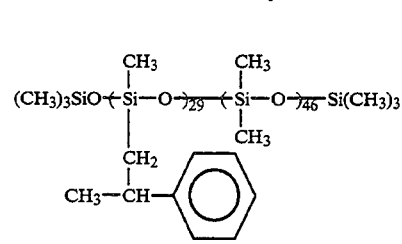 B-2
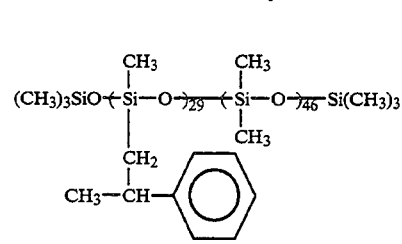 B-3
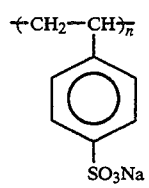 B-4
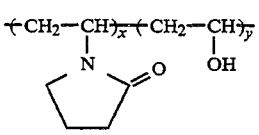 B-5
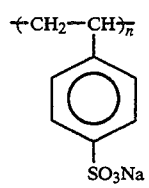 B-6
Molecular weight = approx. 10,000
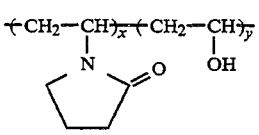 W-1
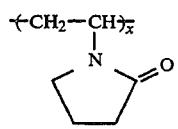 W-2
n = 2-4
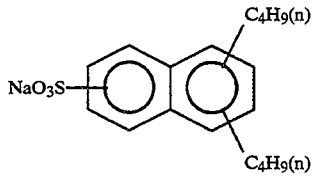 W-3

-continued
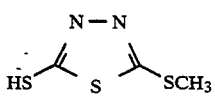 F-1
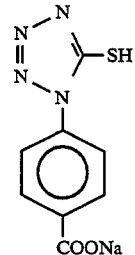 F-2
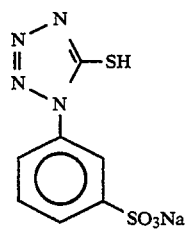 F-3
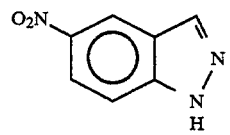 F-4
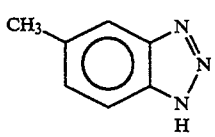 F-5
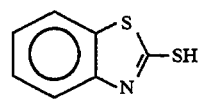 F-6
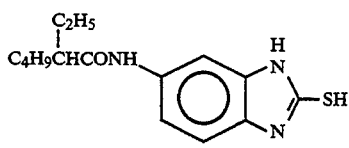 F-7
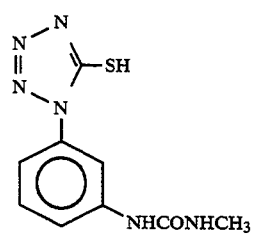 F-8
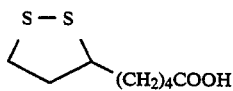 F-9
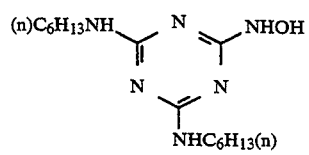 F-10
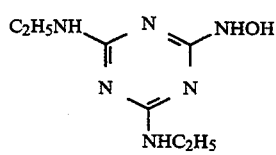 F-11
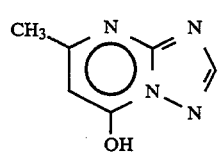 F-12
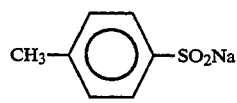 F-13
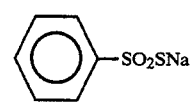 F-14
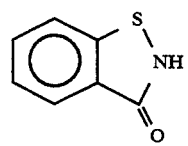 F-15
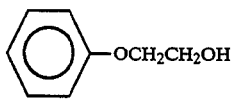 F-16
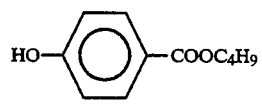 F-17
6) Preparation of Photographic Film
The resultant photographic film was slit to the width of 35 mm and the length of 1.8 m. The film was perforated at the both side according to the methods as described in Japanese Patent Provisional Publication No.

1(1989)-271197. Hence, the obtained photographic film was evaluated as to core set curling tendency.

7) Core Set

The photographic film was cooled by allowing to stand in a room at 25° C. and 60%RH over night. The film was wound around spools of 11.5 mm and 7 mm with the photographic layer side being inside. The obtained photographic film was enclosed in a container, and heated at 40° C. for 24 hours or at 80° C. for 2 hours, to evaluate a core set curling tendency. The standing condition of 40° C. for 24 hours is based on a environment in summer and the standing condition of 80° C. for 2 hours is based on a environment inside a car in summer.

8) Evaluation of Photographic Film as to a Core Set Curling Tendency

The photographic film subjected to the core set treatment was cooled by allowing to stand in a room at 25° C. over night and to take out the film from the container. The film was developed using an automatic developing machine (Mini Lab FP-550B manufactured by Fuji Photo Film Co., Ltd.), followed by immediately measuring a value of core set curl at 25° C. and 60% RH.

The development processing conditions are as follows:

| Processing step | Temperature | Time |
| --- | --- | --- |
| Color developing | 38° C. | 3 minutes |
| Stopping | 38° C. | 1 minutes |
| Washing | 38° C. | 1 minutes |
| Bleaching | 38° C. | 2 minutes |
| Washing | 38° C. | 1 minutes |
| Fixing | 38° C. | 2 minutes |
| Washing | 38° C. | 1 minutes |
| Stabilizing | 38° C. | 2 minutes |

The used processing solutions have the following compositions:

| Color developing solution: | |
| --- | --- |
| Caustic soda | 2 g |
| Sodium sulfite | 2 g |
| Potasium bromide | 0.4 g |
| Sodium chloride | 1 g |
| Borax | 4 g |
| Hydroxylamine sulfate | 2 g |
| Disodium ethylenediaminetetraacetate dihydrate | 2 g |
| 4-Amino-3-methyl-N-ethyl-N-(β-hydroxyethyl)aniline monosulfate | 4 g |
| Water being so added as to the total amount of 1 liter | |
| Stopping solution: | |
| Sodium thiosulfate | 10 g |
| Ammonium thiosulfate (70% aqueous solution) | 30 ml |
| Acetic acid | 30 ml |
| Sodium acetate | 5 g |
| Potassium alum | 15 g |
| Water being so added as to the total amount of 1 liter | |
| Bleaching solution: | |
| Iron (III) sodium ethylenediaminetetraacetate dihydrate | 100 g |
| Potassium bomide | 50 g |
| Ammonium nitrate | 50 g |
| Boric acid | 5 g |
| Ammonia water | adjusting pH to 5.0 |
| Water being so added as to the total amount of 1 liter | |
| Fixing solution: | |
| Sodium thiosulfate | 150 g |
| Sodium sulfide | 15 g |
| Borax | 12 g |
| Acetic acid glacial | 15 ml |
| Potassium alum | 20 g |
| Water being so added as to the total amount of 1 liter | |
| Stabilizing solution: | |
| Boric acid | 5 g |
| Sodium citrate | 5 g |
| Sodium methaborate (tetrahydrates) | 3 g |
| Potassium alum | 15 g |
| Water being so added as to the total amount of 1 liter | |

9) Evaluation of Bonding Strength a) Dry Bonding Strength

Seventh notches at each of length and width directions at intervals 5 mm were cut on the photographic layer with a safety razor to form 36 (6x6) boxes. A cellophane tape (Nitto tape available from Nitto Electric Industrial Co., Ltd.) was allowed to adhere to the boxes and the tape was peeled in the direction at 180 degree to the surface of the film, to observe the unpeeled area of the photographic layer. The dry bonding strength was evaluated according to the unpeeled area as follows:

A: the unpeeled area is not less than 95%
B: the unpeeled area is not less than 90%
C: the unpeeled area is not less than 60%
D: the unpeeled area is more than 40% b) Wet Bonding Strength

The film was scratched with a steel pen to mark "x" on the photographic layer in the processing solution at the various processing stages (i.e., development, fixing and stabilization). The mark "x" area of the film was then vigorously rubbed with a ball of a finger five times. The wet bonding strength was determined based on the maximum width of the area peeled along the line of the mark "x". The wet bonding strength was evaluated as follows:

A: the photographic layer is peeled to an extent less than the mark "x"
B: the maximum peeled area is 2 mm or less
C: the maximum peeled area is 5 mm or less
D: the maximum peeled area is more than 5 mm The results obtained by the above measurements are set forth in Tables 2-A, 2-B, 3-A and 3-B.

TABLE 2-A

| | Stretching magnification | | Heat-set | | Young's modulus ($kg/mm^2$) | | Breaking elongation | | Core-set Diameter of spool | Heat treatment | |
| --- | --- | --- | --- | --- | --- | --- | --- | --- | --- | --- | --- |
| | Length | Width | Temp. (°C.) | Time (sec.) | Length | Width | Length (%) | Width | (mm) | (°C./hrs) | (°C.) |
| Comp. Ex. 1 | 4.5 | 4.5 | 250 | 6 | 750 | 750 | 50 | 53 | 11.5 | 40/24 | None |
| Comp. Ex. 2 | 4.5 | 4.5 | 250 | 6 | 750 | 750 | 51 | 50 | 11.5 | 40/24 | None |
| Comp. Ex. 3 | 4.5 | 4.5 | 250 | 6 | 750 | 750 | 50 | 50 | 11.5 | 40/24 | None |

TABLE 2-A-continued

| | Stretching magnification | | Heat-set | | Young's modulus (kg/mm²) | | Breaking elongation | | Core-set Diameter of spool | | Heat treatment |
|---|---|---|---|---|---|---|---|---|---|---|---|
| | Length | Width | Temp. (°C.) | Time (sec.) | Length | Width | Length (%) | Width | (mm) | (°C./ hrs) | (°C.) |
| Comp. Ex. 4 | 4.5 | 4.1 | 250 | 6 | 750 | 680 | 55 | 60 | 11.5 | 40/24 | None |
| Comp. Ex. 5 | 4.5 | 4.1 | 250 | 6 | 750 | 680 | 55 | 60 | 11.5 | 40/24 | None |
| Comp. Ex. 6 | 4.5 | 4.1 | 250 | 6 | 750 | 680 | 53 | 62 | 11.5 | 40/24 | None |
| Comp. Ex. 7 | 4.0 | 4.0 | 250 | 6 | 660 | 660 | 61 | 65 | 11.5 | 40/24 | None |
| Comp. Ex. 8 | 4.0 | 4.0 | 250 | 6 | 660 | 660 | 60 | 65 | 11.5 | 40/24 | None |
| Comp. Ex. 9 | 4.0 | 4.0 | 250 | 6 | 660 | 660 | 64 | 65 | 11.5 | 40/24 | None |
| Example 1 | 3.8 | 3.3 | 250 | 6 | 640 | 580 | 98 | 121 | 11.5 | 40/24 | None |
| Example 2 | 3.8 | 3.3 | 250 | 6 | 640 | 580 | 95 | 118 | 11.5 | 40/24 | None |
| Example 3 | 3.8 | 3.3 | 250 | 6 | 640 | 580 | 95 | 119 | 11.5 | 40/24 | None |
| Example 4 | 3.5 | 3.8 | 250 | 6 | 600 | 640 | 133 | 92 | 11.5 | 40/24 | None |
| Example 5 | 3.5 | 3.8 | 250 | 6 | 600 | 640 | 130 | 95 | 11.5 | 40/24 | None |
| Example 6 | 3.5 | 3.8 | 250 | 6 | 600 | 640 | 130 | 94 | 11.5 | 40/24 | None |
| Example 7 | 3.6 | 3.8 | 250 | 6 | 620 | 640 | 120 | 105 | 11.5 | 40/24 | None |
| Example 8 | 3.6 | 3.8 | 250 | 6 | 620 | 640 | 118 | 105 | 11.5 | 40/24 | None |
| Example 9 | 3.6 | 3.8 | 250 | 6 | 620 | 640 | 120 | 101 | 11.5 | 40/24 | None |
| Example 10 | 3.2 | 3.3 | 250 | 6 | 570 | 600 | 147 | 125 | 11.5 | 40/24 | None |
| Example 11 | 3.2 | 3.3 | 250 | 6 | 570 | 600 | 144 | 125 | 11.5 | 40/24 | None |
| Example 12 | 3.2 | 3.3 | 250 | 6 | 570 | 600 | 145 | 126 | 11.5 | 40/24 | None |

TABLE 2-B

| | Value of Curl After development | Roughness (μm) | Breaking of rear edge | Tear elongation | | Surface treatment | Bonding strength | | |
|---|---|---|---|---|---|---|---|---|---|
| | | | | Length (g/mm) | Width | | Dry Before | After | Wet |
| Comp. Ex. 1 | 88 | 0.003 | Observed | 650 | 650 | Glow | B | B | B |
| Comp. Ex. 2 | 88 | 0.003 | Observed | 650 | 650 | Corona | C | C | C |
| Comp. Ex. 3 | 89 | 0.003 | Observed | 650 | 650 | UV | C | C | C |
| Comp. Ex. 4 | 85 | 0.003 | Observed | 680 | 750 | Glow | B | B | B |
| Comp. Ex. 5 | 86 | 0.003 | Observed | 680 | 750 | Corona | C | C | C |
| Comp. Ex. 6 | 85 | 0.003 | Observed | 680 | 750 | UV | C | C | C |
| Comp. Ex. 7 | 80 | 0.003 | Observed | 770 | 770 | Glow | B | B | B |
| Comp. Ex. 8 | 80 | 0.003 | Observed | 770 | 770 | Corona | C | C | C |
| Comp. Ex. 9 | 81 | 0.003 | Observed | 770 | 770 | UV | C | C | C |
| Example 1 | 55 | 0.003 | None | 850 | 920 | Glow | A | A | A |
| Example 2 | 55 | 0.003 | None | 850 | 920 | Corona | B | B | B |
| Example 3 | 56 | 0.003 | None | 850 | 920 | UV | B | B | B |
| Example 4 | 54 | 0.003 | None | 900 | 860 | Glow | A | A | A |
| Example 5 | 55 | 0.003 | None | 900 | 860 | Corona | B | B | B |
| Example 6 | 54 | 0.003 | None | 900 | 860 | UV | B | B | B |
| Example 7 | 51 | 0.003 | None | 900 | 890 | Glow | A | A | A |
| Example 8 | 51 | 0.003 | None | 900 | 890 | Corona | B | B | B |
| Example 9 | 52 | 0.003 | None | 900 | 890 | UV | B | B | B |
| Example 10 | 54 | 0.003 | None | 940 | 900 | Glow | A | A | A |
| Example 11 | 55 | 0.003 | None | 940 | 900 | Corona | B | B | B |
| Example 12 | 55 | 0.003 | None | 940 | 900 | UV | B | B | B |

TABLE 3-A

| | Stretching magnification | | Heat-set | | Young's modulus (kg/mm²) | | Breaking elongation (%) | | Core-set Diameter of spool | | Heat treatment |
|---|---|---|---|---|---|---|---|---|---|---|---|
| | Length | Width | Temp. (°C.) | Time (sec.) | Length | Width | Length | Width | (mm) | (°C./ hrs) | (°C.) |
| Comp. Ex. 10 | 4.5 | 4.5 | 250 | 6 | 750 | 750 | 49 | 54 | 7 | 80/2 | 110/48 |
| Comp. Ex. 11 | 4.5 | 4.5 | 250 | 6 | 750 | 750 | 50 | 53 | 7 | 80/2 | 110/48 |
| Comp. Ex. 12 | 4.5 | 4.5 | 250 | 6 | 750 | 750 | 50 | 55 | 7 | 80/2 | 110/48 |
| Comp. Ex. 13 | 4.5 | 4.1 | 250 | 6 | 750 | 680 | 55 | 63 | 7 | 80/2 | 110/48 |
| Comp. Ex. 14 | 4.5 | 4.1 | 250 | 6 | 750 | 680 | 57 | 64 | 7 | 80/2 | 110/48 |
| Comp. Ex. 15 | 4.5 | 4.1 | 250 | 6 | 750 | 680 | 58 | 64 | 7 | 80/2 | 110/48 |
| Comp. Ex. 16 | 4.0 | 4.0 | 250 | 6 | 660 | 660 | 64 | 65 | 7 | 80/2 | 110/48 |
| Comp. Ex. 17 | 4.0 | 4.0 | 250 | 6 | 660 | 660 | 65 | 65 | 7 | 80/2 | 110/48 |
| Comp. Ex. 18 | 4.0 | 4.0 | 250 | 6 | 660 | 660 | 65 | 66 | 7 | 80/2 | 110/48 |
| Example 13 | 3.8 | 3.3 | 250 | 6 | 640 | 580 | 100 | 120 | 7 | 80/2 | 110/48 |
| Example 14 | 3.8 | 3.3 | 250 | 6 | 640 | 580 | 101 | 120 | 7 | 80/2 | 110/48 |
| Example 15 | 3.8 | 3.3 | 250 | 6 | 640 | 580 | 99 | 120 | 7 | 80/2 | 110/48 |
| Example 16 | 3.5 | 3.8 | 250 | 6 | 600 | 640 | 135 | 95 | 7 | 80/2 | 110/48 |
| Example 17 | 3.5 | 3.8 | 250 | 6 | 600 | 640 | 132 | 95 | 7 | 80/2 | 110/48 |
| Example 18 | 3.5 | 3.8 | 250 | 6 | 600 | 640 | 130 | 98 | 7 | 80/2 | 110/48 |
| Comp. Ex. 19 | 3.8 | 2.5 | 250 | 6 | 640 | 400 | 115 | 150 | 7 | 80/2 | 110/48 |
| Comp. Ex. 20 | 3.8 | 2.5 | 250 | 6 | 640 | 400 | 110 | 155 | 7 | 80/2 | 110/48 |
| Comp. Ex. 21 | 3.8 | 2.5 | 250 | 6 | 640 | 400 | 108 | 152 | 7 | 80/2 | 110/48 |
| Example 19 | 3.6 | 3.8 | 250 | 6 | 620 | 640 | 115 | 108 | 7 | 80/2 | 110/48 |
| Example 20 | 3.6 | 3.8 | 250 | 6 | 620 | 640 | 120 | 104 | 7 | 80/2 | 110/48 |

TABLE 3-A-continued

|  | Stretching magnification | | Heat-set | | Young's modulus (kg/mm²) | | Breaking elongation (%) | | Core-set Diameter of spool (mm) | (°C./ hrs) | Heat treatment (°C.) |
| --- | --- | --- | --- | --- | --- | --- | --- | --- | --- | --- | --- |
|  | Length | Width | Temp. (°C.) | Time (sec.) | Length | Width | Length | Width |  |  |  |
| Example 21 | 3.6 | 3.8 | 250 | 6 | 620 | 640 | 118 | 105 | 7 | 80/2 | 110/48 |
| Example 22 | 3.2 | 3.3 | 250 | 6 | 570 | 600 | 139 | 124 | 7 | 80/2 | 110/48 |
| Example 23 | 3.2 | 3.3 | 250 | 6 | 570 | 600 | 140 | 123 | 7 | 80/2 | 110/48 |
| Example 24 | 3.2 | 3.3 | 250 | 6 | 570 | 600 | 142 | 125 | 7 | 80/2 | 110/48 |

TABLE 3-B

|  | Value of Curl After development | Roughness (μm) | Breaking of rear edge | Tear elongation | | Surface treatment | Bonding strength | | |
| --- | --- | --- | --- | --- | --- | --- | --- | --- | --- |
|  |  |  |  | Length | Width (g/mm) |  | Dry Before | After | Wet |
| Comp. Ex. 10 | 82 | 0.003 | Observed | 650 | 650 | Glow | B | B | B |
| Comp. Ex. 11 | 85 | 0.003 | Observed | 650 | 650 | Corona | C | C | C |
| Comp. Ex. 12 | 84 | 0.003 | Observed | 650 | 650 | UV | C | C | C |
| Comp. Ex. 13 | 79 | 0.003 | Observed | 680 | 750 | Glow | B | B | B |
| Comp. Ex. 14 | 80 | 0.003 | Observed | 680 | 750 | Corona | C | C | C |
| Comp. Ex. 15 | 79 | 0.003 | Observed | 680 | 750 | UV | C | C | C |
| Comp. Ex. 16 | 77 | 0.003 | Observed | 770 | 770 | Glow | B | B | B |
| Comp. Ex. 17 | 77 | 0.003 | Observed | 770 | 770 | Corona | C | C | C |
| Comp. Ex. 18 | 78 | 0.003 | Observed | 770 | 770 | UV | C | C | C |
| Example 13 | 58 | 0.003 | None | 850 | 920 | Glow | A | A | A |
| Example 14 | 50 | 0.003 | None | 850 | 920 | Corona | B | B | B |
| Example 15 | 51 | 0.003 | None | 850 | 920 | UV | B | B | B |
| Example 16 | 47 | 0.003 | None | 900 | 860 | Glow | A | A | A |
| Example 17 | 48 | 0.003 | None | 900 | 860 | Corona | B | B | B |
| Example 18 | 47 | 0.003 | None | 900 | 860 | UV | B | B | B |
| Comp. Ex. 19 | 55 | 0.003 | None | 200 | 980 | Glow | B | B | B |
| Comp. Ex. 20 | 55 | 0.003 | None | 200 | 980 | Corona | C | C | C |
| Comp. Ex. 21 | 54 | 0.003 | None | 200 | 980 | UV | C | C | C |
| Example 19 | 54 | 0.003 | None | 900 | 890 | Glow | A | A | A |
| Example 20 | 55 | 0.003 | None | 900 | 890 | Corona | B | B | B |
| Example 21 | 55 | 0.003 | None | 900 | 890 | UV | B | B | B |
| Example 22 | 45 | 0.003 | None | 940 | 900 | Glow | A | A | A |
| Example 23 | 45 | 0.003 | None | 940 | 900 | Corona | B | B | B |
| Example 24 | 45 | 0.003 | None | 940 | 900 | UV | B | B | B |

What is claimed is:

1. A silver halide photographic material which comprises a support comprising polyester and at least one photographic layer provided thereon,
   wherein the polyester comprises poly(ethylene-2,6-naphthalate) which has Young's modulus of 550 to 650 kg/mm² in both a lengthwise direction and a widthwise direction and a breaking elongation of not less than 70%.

2. The silver halide photographic material as defined in claim 1, wherein the breaking elongation is in the range of 70 to 200% in both the lengthwise direction and the widthwise direction.

3. The silver halide photographic material as defined in claim 1, wherein the support of the polyester has a surface roughness of 0.0015 to 0.050 μm.

4. The silver halide photographic material as defined in claim 1, wherein the polyester further contains a fine particle having a particle size of 0.03 to 2.5 μm in the amount of 0.001 to 0.8 weight %.

5. The silver halide photographic material as defined in claim 4, wherein the fine particle is a spherical particle of silica, silicone or crosslinked polystyrene.

6. The silver halide photographic material as defined in claim 1, wherein the support of the polyester is subjected to a corona discharge treatment, a glow discharge treatment or a UV treatment.

7. The silver halide photographic material as defined in claim 1, which is wound around a spool having a diameter of 3 to 12 mm.

8. The silver halide photographic material as defined in claim 1, wherein the support of the polyester has a thickness of 50 to 100 μm.

9. The silver halide photographic material as defined in claim 1, wherein the support of the polyester has been biaxially stretched in a condition of a stretching magnification of 2.8 to 3.8 in both the lengthwise direction and the widthwise direction.

10. The silver halide photographic material as defined in claim 9, wherein the polyester has been subjected to heat setting at 190° to 260° C. for 1 to 60 seconds after the biaxial stretching.

11. The silver halide photographic material as defined in claim 9, wherein the support of the polyester subjected to the biaxial stretching has been further subjected to heat treatment at a temperature of 50° C. to the glass transition temperature for 0.1 to 1,500 hours before formation of the silver halide emulsion layer on the support.

12. The silver halide photographic material as defined in claim 1, wherein the support of the polyester has haze of not more than 3%.

13. The silver halide photographic material as defined in claim 1, wherein the support of the polyester has a friction coefficient between supports of not less than 0.6.

* * * * *